(12) United States Patent
Kim

(10) Patent No.: US 11,354,090 B2
(45) Date of Patent: Jun. 7, 2022

(54) ARTIFICIAL INTELLIGENCE ELECTRONIC APPARATUS, DISPLAY APPARATUS AND METHOD OF CONTROLLING THE SAME

(71) Applicant: SAMSUNG ELECTRONICS CO., LTD., Suwon-si (KR)

(72) Inventor: Hansoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/997,443

(22) Filed: Aug. 19, 2020

(65) Prior Publication Data

US 2021/0064335 A1 Mar. 4, 2021

(30) Foreign Application Priority Data

Aug. 28, 2019 (KR) .......................... 10-2019-0105614

(51) Int. Cl.
*G06F 3/16* (2006.01)
*G06F 1/3234* (2019.01)
(Continued)

(52) U.S. Cl.
CPC ............ *G06F 3/167* (2013.01); *G06F 1/3231* (2013.01); *G06F 1/3265* (2013.01); *H04N 21/42222* (2013.01); *H04N 21/44231* (2013.01)

(58) Field of Classification Search
CPC .......................... G06F 3/167; H04N 21/44231
See application file for complete search history.

(56) References Cited

U.S. PATENT DOCUMENTS 5,254,921 A * 10/1993 Matsubara ......... G05B 19/4062
318/561
9,467,119 B2 10/2016 Lee et al.
(Continued)

FOREIGN PATENT DOCUMENTS

KR 10-1997-0057743 7/1997
KR 10-1912083 10/2018
KR 10-2019-0033138 3/2019

OTHER PUBLICATIONS

Associated Press (byline), "Marco Polo Building Had Outdated Fire Alarms When 3 Died in Blaze," Jul. 28, 2017, Honolulu Civil Beat (Year: 2017).*

(Continued)

*Primary Examiner* — Laurence J Lee
(74) *Attorney, Agent, or Firm* — Staas & Halsey LLP

(57) ABSTRACT

Disclosed are an electronic apparatus, a display apparatus and a method of controlling the same. The electronic apparatus includes a speaker configured to output a sound; a microphone configured to receive a user voice; a communicator configured to perform communication; and a processor. The processor is configured to: identify a state of an external apparatus through the communicator based on reception of the user voice, process the received user voice and output a sound corresponding to a process result through the speaker based on identification that the external apparatus is in a turned-off state, and control the communicator to transmit information about the received user voice to the external apparatus and request the external apparatus to process the voice based on identification that the external apparatus is in a turned-on state.

19 Claims, 23 Drawing Sheets

(51) Int. Cl.
*H04N 21/422* (2011.01)
*H04N 21/442* (2011.01)
*G06F 1/3231* (2019.01)

(56) References Cited

U.S. PATENT DOCUMENTS

| | | |
|---|---|---|
| 9,837,083 B1 | 12/2017 | List |
| 9,986,077 B1 | 5/2018 | Haskin |
| 10,074,371 B1 | 9/2018 | Wang et al. |
| 2010/0302154 A1 | 12/2010 | Lee et al. |
| 2014/0104990 A1 | 4/2014 | Shim |
| 2014/0129234 A1 | 5/2014 | Han et al. |
| 2015/0029089 A1* | 1/2015 | Kim .................. G06F 3/011 345/156 |
| 2018/0199123 A1 | 7/2018 | Rao et al. |
| 2018/0285065 A1* | 10/2018 | Jeong ................ G06F 3/167 |
| 2018/0286400 A1 | 10/2018 | Seo et al. |
| 2018/0322870 A1 | 11/2018 | Lee et al. |
| 2019/0281341 A1* | 9/2019 | Lawrence .......... H04N 21/4126 |

OTHER PUBLICATIONS

International Search Report and Written Opinion of the International Searching Authority dated Dec. 11, 2020 in International Patent Application No. PCT/KR2020/011298.

\* cited by examiner

ARTIFICIAL INTELLIGENCE ELECTRONIC APPARATUS, DISPLAY APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2019-0105614 filed on Aug. 28, 2019 in the Korean Intellectual Property Office, the disclosure of which is incorporated by reference herein in its entirety.

BACKGROUND

Field

The disclosure relates to an electronic apparatus, a display apparatus and a method of controlling the same, and more particularly to an electronic apparatus, a display apparatus, and a method of controlling the same, in which a voice uttered by a user is processed.

Description of the Related Art

An artificial intelligence (AI) speaker may perform functions for listening to music, searching information, etc. by recognizing a user voice.

Recently, the AI speaker has been widely and increasingly used because the AI speaker can be used in controlling household devices by a voice based on voice recognition and thus facilitate creation of a smart home environment.

The AI speaker may be inconvenient for a user who is not used to using electronic devices because various functions such as communication connection are typically set through linking with a smartphone and such a setting process is complicated.

Further, provision of service using the AI speaker is carried out by a restricted method based on a voice output, and therefore there may be limits to the extension of the functions.

SUMMARY

According to an embodiment of the disclosure, an electronic apparatus includes: a speaker configured to output a sound; a microphone configured to receive a user voice; a communicator configured to perform communication; a processor configured to: identify a state of an external apparatus through the communicator based on reception of the user voice, process the received user voice and output a sound corresponding to a process result through the speaker based on identification that the external apparatus is in a turned-off state, and control the communicator to transmit information about the received user voice to the external apparatus and request the external apparatus to process the voice based on identification that the external apparatus is in a turned-on state.

The processor may control the speaker output a sound for guiding a user to turn on the external apparatus based on the identification that the external apparatus is in the turned-off state.

The processor may control the communicator to transmit a request signal for turning on the external apparatus to the external apparatus based on the identification that the external apparatus is in the turned-off state.

The processor may be configured to: identify whether an error occurs in processing the voice, and control the speaker to output a sound for guiding a user to turn on the external apparatus based on identification that the error occurs.

The processor may be configured to: identify whether an error occurs in processing the voice, and may control the communicator to transmit information about the error to the external apparatus based on identification that the error occurs.

The processor may be configured to: identify a service type related to the user voice, and identify whether to request the external apparatus to process the voice based on the identified service type.

The processor may be configured to control the communicator to transmit information about the received user voice to the external apparatus and request the external apparatus to process the voice based on identification that the service type is related to visual content.

According to an embodiment of the disclosure, a display apparatus includes: a display configured to display an image; a communicator configured to perform communication; a processor configured to: identify whether an external apparatus is connected through the communicator based on identification of a change from a turned-off state to a turned-on state, receive information about a user voice from the external apparatus through the communicator based on identification that the external apparatus is connected, process the user voice and control the display to display an image based on a process result.

The display apparatus may further include a user input receiver configured to receive a user input, and the processor may be configured to identify the change from the turned-off state to the turned-on state based on the received user input.

The processor may be configured to identify the change from the turned-off state to the turned-on state, based on identification that a request signal for turning on the display apparatus is received from the external apparatus through the communicator.

The processor may be configured to control the display to display a user interface (UI) about an error in processing the voice based on identification that information about the error is received from the external apparatus through the communicator.

The processor may be may be configured to identify whether information about the error is received, based on the identification of the change from the turned-off state to the turned-on state.

According to an embodiment of the disclosure, a method of controlling an electronic apparatus, includes: identifying a state of an external apparatus based on a user voice received through a microphone; processing the received user voice and outputting a sound corresponding to a process result through a speaker based on identification that the external apparatus is in a turned-off state; and transmitting information about the received user voice to the external apparatus and requesting the external apparatus to process the voice based on identification that the external apparatus is in a turned-on state.

The method may further include outputting a sound for guiding a user to turn on the external apparatus through the speaker based on the identification that the external apparatus is in the turned-off state.

The method may further include transmitting a request signal for turning on the external apparatus to the external apparatus based on the identification that the external apparatus is in the turned-off state.

The method may further include: identifying whether an error occurs in processing the voice; and outputting a sound for guiding a user to turn on the external apparatus through the speaker based on identification that the error occurs.

The method may further include: identifying whether an error occurs in processing the voice; and transmitting information about the error to the external apparatus based on identification that the error occurs.

The method may further include: identifying a service type related to the user voice; and identifying whether to request the external apparatus to process the voice based on the identified service type.

According to an embodiment of the disclosure, a method of controlling a display apparatus, includes: identifying whether an external apparatus is connected for communication based on identification of a change from a turned-off state to a turned-on state, receiving information about a user voice from the external apparatus based on identification that the external apparatus is connected, processing the user voice and displaying an image based on a process result.

The method may further include displaying a user interface (UI) about an error in processing the voice based on identification that information about the error is received from the external apparatus.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
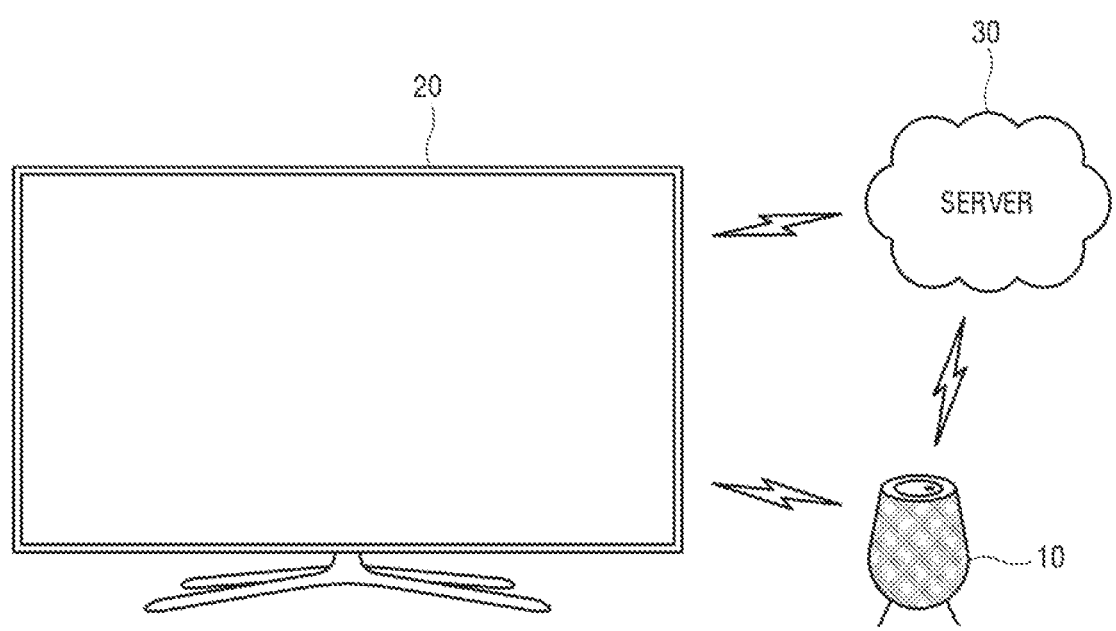
FIG. 1 illustrates an electronic apparatus and a display apparatus according to an embodiment of the disclosure.

An aspect of the disclosure is to provide an electronic apparatus, a display apparatus, and a method of controlling the same, in which the electronic apparatus capable of receiving and processing a user voice autonomously processes the user voice or allows the display apparatus to selectively process the user voice, and provides process results in accordance with on/off states of the display apparatus, thereby extending functions and services.

Further, an aspect of the disclosure is to provide an electronic apparatus, a display apparatus, and a method of controlling the same, in which the electronic apparatus autonomously processes a received user voice or allows the display apparatus to selectively process the user voice, and provides process results in accordance with service/content types provided by voice processes, thereby receiving more efficiently the service/content through a screen when visual feedback is needed.

Further, an aspect of the disclosure is to provide an electronic apparatus, a display apparatus, and a method of controlling the same, in which the electronic apparatus provides information about an error in processing a user voice to the display apparatus, so that the error can be corrected through the display apparatus.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

Figure 2:
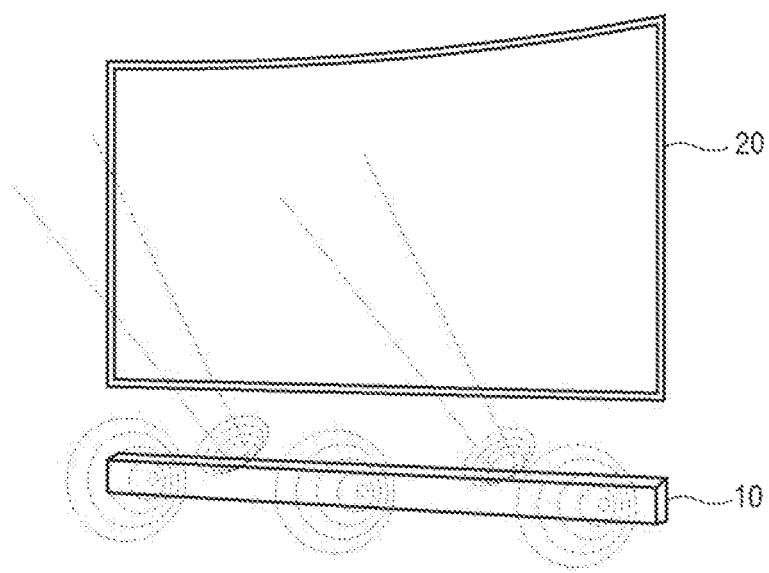
FIG. 2 illustrates an electronic apparatus and a display apparatus according to another embodiment of the disclosure.

FIG. 1 illustrates an electronic apparatus and a display apparatus according to an embodiment of the disclosure, and FIG. 2 illustrates an electronic apparatus and a display apparatus according to another embodiment of the disclosure.

The electronic apparatus 10 according to an embodiment of the disclosure may output a sound to thereby provide audio content to a user as shown in FIGS. 1 and 2.

The electronic apparatus 10 may be embodied by an output apparatus including at least one speaker (see '110' in FIG. 3) as an output unit to output a sound. According to the disclosure, there are no limits to the number, shape and position of speakers 110 provided in the electronic apparatus 10.

The electronic apparatus 10 receives a voice uttered by a user (hereinafter, referred to as a user voice), and processes the voice to perform operation corresponding to the received voice. Here, the electronic apparatus 10 may output a sound corresponding to a process result of the user voice through the speaker 110 provided as the output unit, as the operation corresponding to the received voice.

The electronic apparatus 10 may include at least one microphone (see '120' in FIG. 3) as an input unit to receive a user voice. According to the disclosure, there are no limits to the number, shape and position of microphones 120 provided in the electronic apparatus 10.

According to an embodiment, the electronic apparatus 10 may receive an input audio signal (hereinafter, also referred to as an acoustic signal) from at least one external apparatus, for example, a television (TV) or the like display apparatus 20 through a communicator (see '140' in FIG. 3), and processes the input audio signal to thereby generate an output audio signal. A sound corresponding to the processed audio signal may be output through the speaker 110.

According to the disclosure, the external apparatus capable of providing an audio signal to the electronic apparatus 10 is not limited to the display apparatus 20 shown in FIGS. 1 and 2. The external apparatus may, for example, include various apparatuses such as a set-top box (STB), an audio/video (A/V) receiver, a player for a digital versatile disc (DVD) or Blu-ray, or the like optical disc, a mobile apparatus, etc. to provide an input audio signal to the electronic apparatus 10.

According to an embodiment, the electronic apparatus 10 may, as shown in FIG. 1, be embodied by an artificial intelligence (AI) speaker (hereinafter, also referred to as a smart speaker).

The AI speaker receives a voice of a user, and performs various functions for listening music, searching information, etc. based on voice recognition of the received voice. The AI speaker is not the speaker for outputting a sound, but an apparatus with a built-in virtual secretary/voice assistant capable of interaction with a user through functions of voice recognition, a cloud infrastructure, etc., thereby providing various services to the user.

The electronic apparatus 10 according to the disclosure embodied as the AI speaker is not limited to that shown in FIG. 1. According to another embodiment, the electronic apparatus 10 may for example be embodied in the form of a sound bar installed under the display apparatus 20 as shown in FIG. 2, thereby functioning as the AI speaker.

According to still another embodiment, the electronic apparatus 10 may be embodied by a laptop computer, a tablet computer, a mobile phone, a multimedia player, an MP3 player, a set-top box, and the like various apparatuses capable of processing an audio signal and outputting a sound through the speaker provided therein or connected by wired or wireless communication, thereby functioning as the AI speaker. In this case, an application for the function of the AP speaker may be installed and driven in the electronic apparatus 10.

The electronic apparatus 10 may communicate with various external apparatuses such as the display apparatus 20 and a server 30 through the communicator 140.

According to the disclosure, there are no limits to a communication method between the electronic apparatus 10 and the external apparatus, and therefore the electronic apparatus 10 may be embodied to communicate with the external apparatus through various wired or wireless connection methods (for example, Bluetooth, Wi-Fi, or Wi-Fi direct, etc.)

According to an embodiment, the electronic apparatus 10 performs communication with the external apparatus such as the display apparatus 20, identifies the state of the display apparatus 20 through the communicator 140, and autonomously processes a user voice or transmits the user voice or information about the user voice to the display apparatus 20 through the communicator 140 to thereby make a request for the process to the display apparatus 20 according to the identification results.

Figure 4:
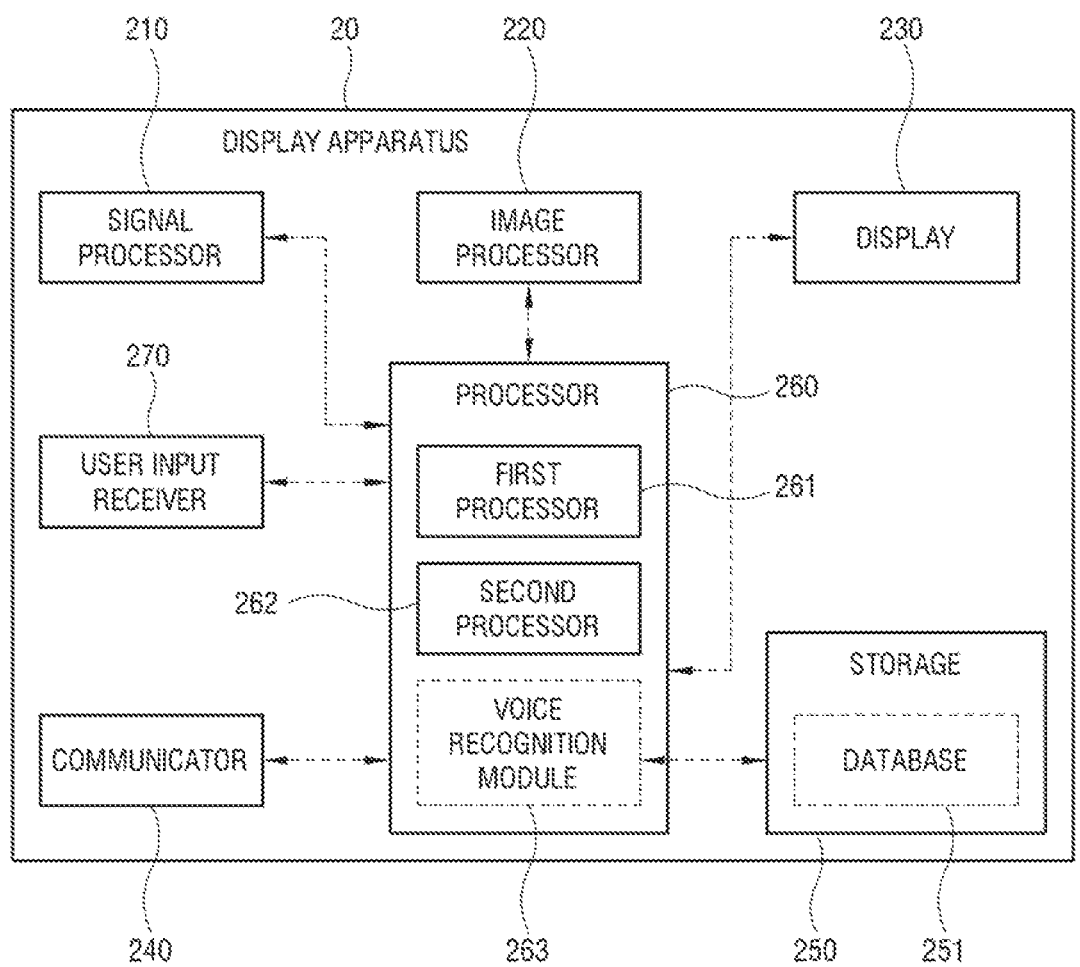
FIG. 4 is a block diagram of a display apparatus according to an embodiment of the disclosure.

The display apparatus 20 may receive the information about the user voice from the electronic apparatus 10 and process the user voice, thereby outputting a process result through a display (se '230' in FIG. 4). Further, the display apparatus 20 may transmit a signal corresponding to the process result to the electronic apparatus 10, so that the electronic apparatus 10 can output a sound based on the process result.

The server 30 is provided to perform wired or wireless communication with the electronic apparatus 10 and the display apparatus 20. The server 30 may, for example, be embodied by a cloud type, and store and manage a user account of the electronic apparatus 10 and the display apparatus 20.

According to an embodiment, the server 30 may be provided with a data for recognizing a voice uttered by a user, in other words, a database (DB) storing information. The database may, for example, include a plurality of acoustic models previously identified by modeling signal characteristics of a voice. Further, the database may further include a language model previously identified by modeling a linguistic sequence relationship between words, syllables, etc. corresponding to lexicons targeted for recognition.

The electronic apparatus 10 or the display apparatus 20 may be connected to the server 30 through a wired or wireless network and access the database, thereby identifying and processing a received user voice and outputting a sound or image based on the process result.

Below, the configurations and operations of the electronic apparatus and the display apparatus according to an embodiment of the disclosure will be described in detail.

Figure 3:
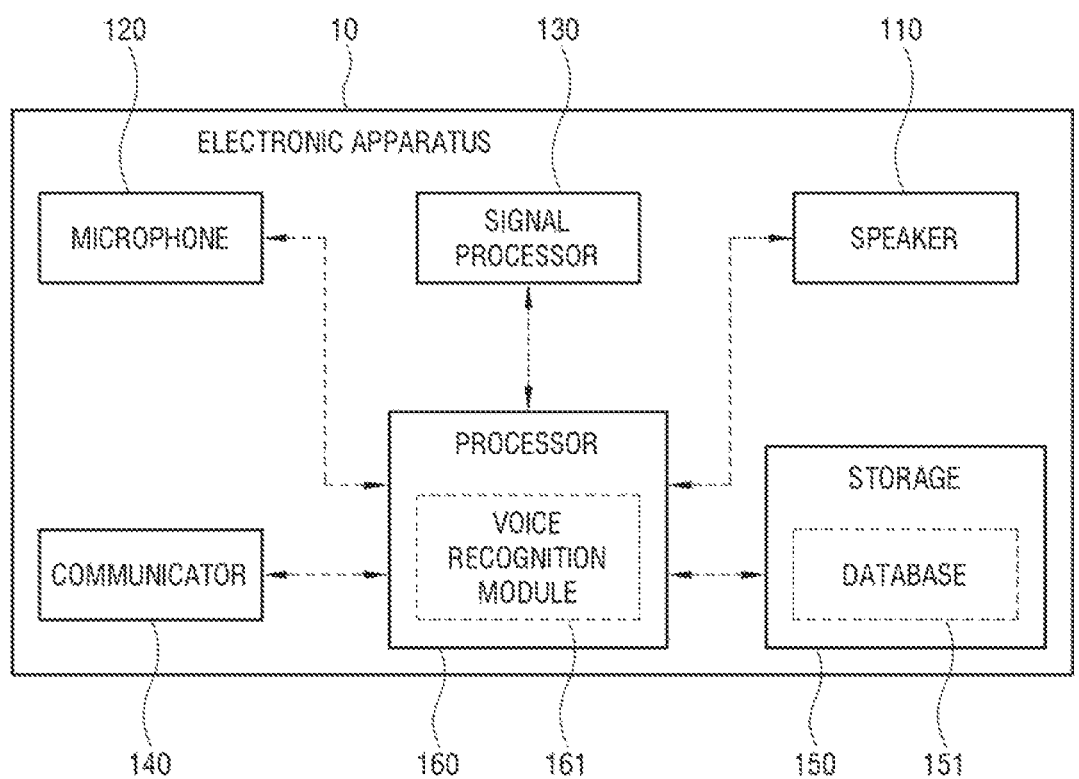
FIG. 3 is a block diagram of an electronic apparatus according to an embodiment of the disclosure.

FIG. 3 is a block diagram of an electronic apparatus according to an embodiment of the disclosure.

As shown in FIG. 3, the electronic apparatus 10 according to an embodiment of the disclosure includes the speaker 110, the microphone 120, a signal processor 130, the communicator 140, a storage 150, and a processor 160.

However, the configuration of the electronic apparatus 10 an embodiment of the disclosure shown in FIG. 3 is merely an example, and an electronic apparatus according to another embodiment may be embodied by other configurations than the configuration shown in FIG. 3. In other words, the electronic apparatus of the disclosure may include another element in addition to the elements shown in FIG. 3, or may exclude at least one element from the elements shown in FIG. 3.

The speaker 110 outputs a sound. The speaker 110 may be, for example, provided to output a sound of an audible frequency band of 20 Hz to 20 KHz. The speaker 110 may output a sound based on audio signals corresponding to a plurality of channels.

According to an embodiment, the speaker 110 may output a sound based on a process of a user voice received through the microphone 120.

The microphone 120 may receive a voice uttered by a user, in other words, a sound wave.

The sound wave input to the microphone 120 is converted into an electric signal by a signal converter. According to an embodiment, the signal converter may include an analog-to-digital (AD) converter for converting an analog sound wave into a digital signal. Further, according to an embodiment, the signal converter may be included in the signal processor 130 to be described later.

According to an embodiment of the disclosure, the microphone 120 may be provided in the electronic apparatus 10 itself.

However, according to another embodiment, the microphone 120 may be not included in the electronic apparatus 10 but provided in a separate apparatus.

For example, a mobile apparatus such as a smartphone capable of receiving a user voice is given as an example of the separate apparatus in which the microphone 120 is provided. In this case, a user voice received in the mobile apparatus may be converted into an electric signal (i.e. a voice signal) and then transmitted to the electronic apparatus 10. Here, when the electronic apparatus 10 is embodied by the AI speaker, the electronic apparatus may be stored and installed with an AI speaker application for linking with the AI speaker, and the electronic apparatus may receive a voice uttered by a user while the AI speaker application is executed and activated.

Alternatively, a user voice may be received through a microphone installed in a remote controller provided as an input unit of the display apparatus 20 or the display apparatus 20, and the electronic apparatus 10 may receive a voice signal corresponding to the user voice from the display apparatus 20.

The signal processor 130 processes an audio signal (i.e. an acoustic signal). The audio signal processed in the signal processor 130 is output as a sound through the speaker 110, and thus provided as audio content to a user.

The signal processor 130 may be embodied by a digital signal processor (DSP) or the like microprocessor.

According to an embodiment, the signal processor 130 may be embodied as included in a main system-on-chip (SoC) mounted to a printed circuit board (PCB) internally provided in the electronic apparatus 10. According to an embodiment, the main SoC may further include a central processing unit (CPU) or an application processor (AP) as an example of the processor 160 (to be described later).

The communicator 140 performs communication with various external apparatuses such as the display apparatus 20, the server 30, a mobile apparatus, etc.

The communicator 140 may be embodied as a communication circuitry including wireless communication modules (e.g. a software (S/W) module, a chip, etc.) corresponding to various communication protocols.

According to an embodiment, the communicator 140 includes a wireless local area network (WLAN) unit. The WLAN unit may wirelessly be connected to the external apparatus through an access point (AP) under control of the processor 160. The WLAN unit includes a Wi-Fi communication module.

According to an embodiment, the communicator 140 includes a short-range communication module that supports wireless direct communication between the electronic apparatus 10 and the external apparatus without the AP. The short-range communication module may support at least one among Wi-Fi direct, Bluetooth, Bluetooth low energy, RF communication, IR data association (IrDA), Zigbee, ultra-wideband (UWB), and near field communication (NFC). When the electronic apparatus 10 performs direct communication with the external apparatus, the storage 150 may store identification information (e.g. media access control (MAC) address or IP address) about the external apparatus targeted for the communication.

In the electronic apparatus 10 according to an embodiment of the disclosure, the communicator 140 is provided to perform the wireless communication with the external apparatus through at least one of the WLAN unit or the short-range communication module according to performance.

According to another embodiment, the communicator 140 may include Ethernet or the like wired communication module. Alternatively, the communicator 140 may further include communication modules based on various communication methods such as long-term evolution or the like mobile telecommunication, magnetic field or the like electromagnetic (EM) communication, visible light communication, etc.

According to an embodiment, the communicator 140 may include connectors to transmit/receive a signal/data based on high definition multimedia interface (HDMI), universal serial bus (USB), Component, and the like standards. Here, the communicator 140 may include at least one connector or terminal corresponding to these standards.

According to an embodiment, the communicator 140 may transmit predetermined data as information about a user voice received through the microphone 120 to the external apparatus, in other words, the display apparatus 20. Here, there are no limits to the format/kind of data to be transmitted, and the data may for example include an audio signal corresponding a voice uttered by a user, voice features extracted from the audio signal, etc.

Further, the communicator 140 may receive data as a result of processing the user voice from the display apparatus 20. The electronic apparatus 10 outputs a sound corresponding to a voice process result, based on the received data, through the speaker 110.

The storage 150 is configured to store various pieces of data of the electronic apparatus 10. The storage 150 may be embodied by a nonvolatile memory (or a writable read only memory (ROM)) which can retain data even though the electronic apparatus 10 is powered off and reflect changes. That is, the storage 150 may include one of a flash memory, an electrically programmable ROM (EPROM) or an electrically erasable and programmable ROM (EEPROM).

The storage 150 may further include a volatile memory such as a dynamic random access memory (DRAM) or static RAM (SRAM), of which reading or writing speed for the electronic apparatus 10 is faster than that of the nonvolatile memory.

Data stored in the storage 150 may for example include not only an operating system (OS) for driving the electronic apparatus 10 but also various software, programs, applications, appended data, etc. executable on the OS.

In the electronic apparatus 10 according to an embodiment of the disclosure, the application stored and installed in the storage 150 may include the AI speaker application to recognize a user voice received through the microphone 120 and perform operation based on the recognition. According to an embodiment, the AI speaker application is executed or activated when a predetermined keyword input through the microphone 120, a user's control on a specific button for the electronic apparatus 10, etc. is identified, thereby applying a voice recognition function to a voice uttered by a user. Here, the activation of the application may include switching over the running state of the application from a background mode to a foreground mode.

In the electronic apparatus 10 according to an embodiment, the storage 150 may, as shown in FIG. 3, include a database 151 in which data, i.e. information is stored to recognize a user voice receivable through the microphone 120.

The database 151 may, for example, include a plurality of acoustic models previously identified by modeling signal characteristics of a voice. Further, the database 151 may further include a language model previously identified by modeling a linguistic sequence relationship between words, syllables, etc. corresponding to lexicons targeted for recognition.

Alternatively, the database stored with information for recognizing the user voice may be provided in the server 30 given as an example of the external apparatuses connectable to the wired or wireless network through the communicator 140 as described above. The server 30 may, for example, be embodied by the cloud type.

The processor 160 performs control for operating general elements of the electronic apparatus 10.

The processor 160 executes a control program (or an instruction) to perform such a control operation, and executes the loaded control program. The processor 160 may be embodied by at least one general-purpose processor, for example, the CPU or the application processor (AP), which loads at least a part of the control program from the nonvolatile memory installed with the control program into the volatile memory and executes the loaded control program.

The processor 160 include a single-core processor, a dual-core processor, a triple-core processor, a quad-core processor, or the like multiple-core processor. The processor 160 may include a plurality of processors, for example, a main processor and a sub processor that operates in a sleep mode (e.g. when the electronic apparatus does not fully operate while being supplied with only standby power). Further, the processor, the ROM, and the RAM are connected to one another through an internal bus, and the ROM and the RAM are included in the storage 150.

According to the disclosure, the CPU or the application processor embodied as the processor 160 may be included in a main SoC mounted to a PCB internally provided in the electronic apparatus 10. According to an embodiment, the main SoC may further include the foregoing signal processor 130.

The control program may include a program(s) embodied by at least one of a basic input/output system (BIOS), a device driver, an OS, a firmware, a platform, or an application. According to an embodiment, the application may be previously installed or stored in the electronic apparatus 10 when the electronic apparatus 10 is manufactured, or may be installed in the electronic apparatus 10 based on application data received from the outside when it is required in the future. The application data may for example be downloaded from an external server such as an application market to the electronic apparatus 10. Such an external server is merely an example of a computer program product according to the disclosure, but not limited thereto.

The processor 160 may, as shown in FIG. 3, include a voice recognition module 161 (hereinafter, also referred to as a voice recognition engine) capable of recognizing a voice uttered by a user.

According to an embodiment, the voice recognition function of the voice recognition module 161 may be performed based on one or more voice recognition algorithms. For example, the voice recognition module 161 extracts a vector of voice features from a user voice, and compares the extracted vector with the acoustic model of the server 30 or the database 151, thereby performing the voice recognition. Here, the acoustic model may for example be a model based on previously performed learning.

An embedded type of the voice recognition module 161 resident in the CPU provided as the processor 160 is described by way of example, but the disclosure is not limited to this example. Alternatively, the voice recognition module 161 may be embodied by an element of the electronic apparatus 10 separated from the CPU, for example, by a microcomputer (MICOM) or the like separate chip as a dedicated processor for the voice recognition function.

According to an embodiment, the processor 160 may identify the state of the display apparatus 20 provided as the external apparatus through the communicator 140 based on the user voice received through the microphone 120, and process the received user voice and output a sound corresponding to a process result through the speaker 110 or control the communicator 140 to transmit the received user voice to the display apparatus 20 and make a request for processing the voice to the display apparatus 20 according to the identification results.

According to an embodiment, the operations of the processor 160 may be carried by a computer program stored in a computer program product (not shown) provided separately from the electronic apparatus 10. In this case, the computer program product includes a memory in which instructions corresponding to the computer programs are stored, and a processor. When the instruction is executed by the processor 160, the instruction includes identifying the state of the display apparatus 20 based on reception of the user voice, and processing the received user voice and outputting a sound corresponding to a process result or controlling the communicator 140 to transmit the received user voice to the display apparatus 20 and make a request for processing the voice to the display apparatus 20 according to the identification results.

Therefore, the processor 160 of the electronic apparatus 10 may download and execute a computer program stored in a separate computer program product, and perform the foregoing operations of the instructions.

FIG. 4 is a block diagram of a display apparatus according to an embodiment of the disclosure.

According to an embodiment of the disclosure, the display apparatus 20 displays an image by processing an image signal from an external signal source, i.e. an image source according to preset processes.

According to an embodiment, the display apparatus 20 may include a TV that processes a broadcast signal based on at least one of a broadcasting signal, broadcast information or broadcast data from a transmitter of a broadcasting station and displays an image based on the broadcast signal.

According to the disclosure, there are no limits to the kinds of image sources for providing content, and the display apparatus 20 may, for example, receive an image signal from a STB, a player for an optical disc such as Blu-ray disc or DVD, a personal computer (PC) such as a desktop or laptop computer, a game console, a mobile device including a smart pad such as a smartphone or a tablet computer, etc.

When the display apparatus 20 is the TV, the display apparatus 20 may wirelessly receive a radio frequency (RF) signal, i.e. a broadcast signal from the broadcasting station. To this end, the display apparatus 20 may include an antenna configured to receive a broadcast signal, and a tuner configured to be tuned to a channel corresponding to a broadcast signal.

In the display apparatus 20, the broadcast signal may be received through a terrestrial wave, a cable, a satellite, etc., and a signal source is not limited to the external apparatus or the broadcasting station. That is, any apparatus or station capable of transmitting and receiving data may be included in the image source according to the embodiment.

Standards for a signal received in the display apparatus 20 may be variously given corresponding to the types of the apparatus, and image content may for example be received based on a high definition multimedia interface (HDMI), a display port (DP), a digital visual interface (DVI), composite video, component video, super video, Syndicat des Constructeurs d'Appareils Radiorécepteurs et Téléviseurs (SCART), USB, etc. by a wire.

The display apparatus 20 may receive image content from a server or the like prepared for providing content through wired or wireless network communication, and there are no limits to the kinds of communication.

According to an embodiment, the display apparatus 20 may perform at least one of wireless communication using an access point (AP) or wireless communication directly connected to other apparatuses the AP. For example, the display apparatus 20 may receive content from an image source through the wireless network communication such as Wi-Fi, Wi-Fi Direct, Bluetooth, Bluetooth low energy, Zigbee, UWB, NFC, etc. Alternatively, the display apparatus 20 may receive content through Ethernet or the like wired network communication.

Further, according to an alternative embodiment, the display apparatus 20 may receive content through Ethernet or the like wired network communication.

Further, according to an embodiment, the display apparatus 20 may serve as the AP through which various peripheral devices such as a smartphone can perform the wireless communication.

The display apparatus 20 may receive content provided in the form of a real-time streaming file through a wired or wireless network.

Further, the display apparatus 20 may perform a signal process to display thereon a moving image, a still image, an application, an on-screen display (OSD), a UI (hereinafter also referred to as a graphic user interface (GUI) for various operation controls, etc. based on a signal/data stored in an internal/external storage medium.

According to an embodiment, the display apparatus 20 may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

The display apparatus 20 according to an embodiment of the disclosure may, as shown in FIG. 4, include a signal receiver 210, an image processor 220, a display 230, a communicator 240, a storage 250, a processor 260, and a user input receiver 270.

However, the configuration of the display apparatus 20 an embodiment of the disclosure shown in FIG. 4 is merely an example, and a display apparatus according to another embodiment may be embodied by other configurations than the configuration shown in FIG. 4. In other words, the display apparatus of the disclosure may include another element in addition to the elements shown in FIG. 4, or may exclude at least one element from the elements shown in FIG. 4.

The signal receiver 210 receives a signal, i.e. image content from an external image source. According to an embodiment, the signal receiver 210 may include a tuner configured to be tuned to a channel corresponding to a broadcast signal.

According to an embodiment, the signal receiver 210 includes a connector to which the image source is connected by a wire. The display apparatus 20 may receive content from the image source connected to the connector by a wire through the connector.

The connector may be embodied as a communication circuitry including a data input/output interface where communication modules (e.g. a S/W module, a chip, etc.), port, etc. are combined corresponding to various kinds of communication protocols.

According to an embodiment, the connector may for example be configured to transmit/receive a signal/data based on HDMI, HDMI consumer electronics control (CEC), USB, Component, and the like standards, and include at least one connector or terminal corresponding to these standards.

The connector basically receives a signal from the image source, but may interactively transmit and receive a signal.

According to an embodiment, the image source connected to the display apparatus 20 by a wire through the connector is the set-top box, the PC or the like external apparatus, but the disclosure is not limited to this embodiment. For example, the display apparatus 20 according to an alternative embodiment may connect with a mobile apparatus by a wire through the connector.

The image processor 220 performs various preset image processing processes with regard to received content, i.e. image signal. The image processor 220 outputs an image signal generated or combined by performing such image processing processes to the display 230, so that the display 230 can display an image based on the image signal. The image signal processed by the image processor 220 may be based on data stored in the flash memory, the HDD, or the like nonvolatile storage 250.

The image processor 220 may include a decoder for decoding the image signal to correspond to the image format for the display apparatus 20, and a scaler for adjusting the image signal to correspond to the output standards for the display 230.

According to an embodiment, the decoder may for example be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

According to the disclosure, there are no limits to the kinds of content to be processed by the image processor 220. For example, the content processed by the image processor 220 includes not only a videoclip and the like moving image, but also a joint photographic experts group (JPEG) file and the like picture, a background image and the like still image, etc.

There are no limits to the kinds of processes performed by the image processor 220, and the image processor 220 may for example further perform at least one among various processes such as de-interlacing for converting an interlaced type broadcast signal into a progressive type broadcast signal, detail enhancement, frame refresh rate conversion, line scanning, etc.

The image processor 220 may be embodied in the form of a group of individual elements for independently performing such processes, or may be embodied as included in a main SoC where many functions are integrated. The main SoC may further include at least one application processor or CPU embodied as an example of the processor 260 (to be described later).

According to an embodiment, the image processor 220 may be embodied by an image board that various chipsets, a memory, electronic parts, wiring, and the like circuit configuration for performing such processes are mounted to a PCB. In this case, the display apparatus 20 may include a single image board on which the image processor 220 and the processor 260 are provided. Of course, this is merely an example. Alternatively, the tuner, the video processor, and the controller may be provided on a plurality of PCBs connected for communication with each other.

The signal generated or combined by the process of the image processor 220 is output to the display 230.

The display 230 displays an image based on the signal received from the image processor 220 on a screen thereof.

There are no limits to the types of the display 230, and the display 230 may be embodied by various display types such as liquid crystal, plasma, a light-emitting diode, an organic light-emitting diode, a surface-conduction electron-emitter, a carbon nano-tube, nano-crystal, etc.

According to an embodiment, the display 230 includes a display panel for displaying an image thereon, and may further include an additional element (e.g. a driver) according to its types. The driver may include one or more driver integrated circuits (IC), and output an electric signal for driving electronic devices of a light source or a screen so that the display 230 can display an image based on a signal received from the image processor 220.

The communicator 240 communicates with various external apparatuses such as the electronic apparatus 10, the server 30, etc.

The communicator 240 is embodied by various communication methods corresponding to the external apparatus including the electronic apparatus 10 and the server 30.

The communicator 240 may be embodied by a communication circuitry including wireless communication modules (an S/W module, a chip, etc.), etc. corresponding to various kinds of communication protocols.

According to an embodiment, the communicator 240 includes a wireless local area network (WLAN) unit. The WLAN unit may connect with at least one external apparatus through the access point (AP) under control of the processor 260. The WLAN unit may include a Wi-Fi communication module.

According to an embodiment, the communicator 240 includes a short-range communication module that supports wireless direct communication between the display apparatus 20 and the external apparatus without the AP. The short-range communication module may support at least one among Wi-Fi direct, Bluetooth, Bluetooth low energy, RF communication, IrDA, Zigbee, UWB, and NFC. When the display apparatus 20 performs direct communication with the external apparatus, the storage 250 may store identification information (e.g. MAC address or IP address) about the external apparatus targeted for the communication. In the display apparatus 20 according to an embodiment of the disclosure, the communicator 240 is provided to perform the wireless communication with the external apparatus through at least one of the WLAN unit or the short-range communication module according to performance.

According to an embodiment, the communicator 240 may further include a wired communication module such as Ethernet, etc.

According to an embodiment, the communicator 240 may receive data as information about a user voice from the electronic apparatus 10. Here, there are no limits to the format/kind of data to be received, and the data may for example include an audio signal corresponding a voice uttered by a user, voice features extracted from the audio signal, etc.

Further, the communicator 240 may output data a voice process result based on the information about the received user voice to the electronic apparatus 10. The electronic apparatus 10 outputs a sound corresponding to the voice process result, based on the received data, through the speaker 110.

The storage 250 may be configured to store various pieces of data of the display apparatus 20. The storage 250 may be embodied by a nonvolatile memory (or a writable ROM) which can retain data even though the display apparatus 20 is powered off, and mirror changes. That is, the storage 250 may include at least one among a flash memory, an HDD, an EPROM or an EEPROM.

The storage 250 may further include a volatile memory such as a RAM, and the volatile memory may be provided as a DRA) or SRAM, of which reading or writing speed for the display apparatus 20 is faster than that of the nonvolatile memory.

In this specification, the term 'storage' is defined to include not only the nonvolatile memory but also the volatile memory, a cache memory provided in the processor 260, a memory card (e.g. a micro SD card, a memory stick, etc.) mountable to the display apparatus 20 through the connector according to predetermined standards, etc.

Data stored in the storage 250 may for example include not only an OS for driving the display apparatus 20 but also various software, programs, applications, image data, graphic data, appended data, etc. executable on the OS.

The graphic data is output to the display 230 as an image signal processed by the image processor 220, and may be displayed as graphics such as OSD, a GUI (hereinafter also referred to as a "UI"), etc. in a certain area on the screen of the display 230.

In the display apparatus 20 according to an embodiment of the disclosure, the application stored and installed in the storage 250 may include the AI speaker application to recognize a user voice received through the main body, the remote controller, etc. of the electronic apparatus 10 or the display apparatus 20 and perform operation based on the recognition. According to an embodiment, the AI speaker application is executed or activated when the display apparatus 20 is turned on by a request from the electronic apparatus 10 that receives the user voice, thereby applying a voice recognition function to the user voice received from the electronic apparatus 10. Here, the activation of the application may include switching over the running state of the application from a background mode to a foreground mode.

In the display apparatus 20 according to an embodiment, the storage 250 may, as shown in FIG. 4, include a database 251 in which data, i.e. information is stored to recognize a user voice received from the electronic apparatus 20.

The database 251 may, for example, include a plurality of acoustic models previously identified by modeling signal characteristics of a voice. Further, the database 251 may further include a language model previously identified by modeling a linguistic sequence relationship between words, syllables, etc. corresponding to lexicons targeted for recognition.

Alternatively, the database stored with information for recognizing the user voice may be provided in the server 30 given as an example of the external apparatuses connectable to the wired or wireless network through the communicator 240 as described above. The server 30 may, for example, be embodied by the cloud type.

The processor 260 performs control for operating general elements of the display apparatus 20.

The processor 260 executes a control program (or an instruction) to perform such a control operation, and executes the loaded control program. The processor 260 may be embodied by at least one general-purpose processor, for example, the CPU or the application processor (AP), which loads at least a part of the control program from the nonvolatile memory installed with the control program into the volatile memory and executes the loaded control program.

The processor 260 include a single-core processor, a dual-core processor, a triple-core processor, a quad-core processor, or the like multiple-core processor. Further, the processor, the ROM, and the RAM are connected to one another through an internal bus, and the ROM and the RAM are included in the storage 250.

According to an embodiment, the processor 260 may include a plurality of processors. In other words, the processor 260 may, as shown in FIG. 4, include a first processor 261 provided as a main processor, and a second processor 262 provided as a sub processor.

The second processor 262 may operate in a standby mode, i.e. a sleep mode (e.g. when the display apparatus is supplied with only standby power and does not serve to display an image).

When the display apparatus 20 is in the standby mode, the first processor 261 maintains a power-saving state, in other words, a turned-off state. Here, the turned-off state refers to a kind of soft turned-off state in which power supplied to the display apparatus 20 is not completely shut off. When the display apparatus 20 in the standby mode receives a user input through the user input receiver 270 to be described later or receives a signal from the electronic apparatus 10, the second processor 262 detects such reception and wakes up the first processor 261. The first processor 261 is switched over from the turned-off state to a turned-on state, and it is thus possible to identify a mode change of the display apparatus 20, i.e. from the turned-off state of the standby mode to the turned-on state of a normal mode.

According to an embodiment, the CPU or application processor embodied as an example of the processor 260 according to the disclosure may be embodied as included in the main SoC mounted to the PCB internally provided in the display apparatus 20. According to an embodiment, the main SoC may further include the foregoing image processor 220.

The control program may include a program(s) achieved by at least one of a BIOS, a device driver, an OS, a firmware, a platform, or an application. According to an exemplary embodiment, the application may be previously installed or stored in the display apparatus 20 when the display apparatus 20 is manufactured, or may be installed in the display apparatus 20 on the basis of application data received from the outside when it is required in the future. The application data may for example be downloaded from an external server such as an application market to the display apparatus 20. Such an external server is merely an example of the computer program product according to the disclosure, but not limited thereto.

The processor 260 may, as shown in FIG. 4, include a voice recognition module 263 (hereinafter, also referred to as a voice recognition engine) capable of recognizing a voice uttered by a user.

According to an embodiment, the voice recognition function of the voice recognition module 263 may be performed based on one or more voice recognition algorithms. For example, the voice recognition module 263 extracts a vector of voice features from a user voice, and compares the extracted vector with the acoustic model of the database 251, thereby performing the voice recognition. Here, the acoustic model may for example be a model based on previously performed learning.

An embedded type of the voice recognition module 263 resident in the CPU provided as the processor 260 is described by way of example, but the disclosure is not limited to this example. Alternatively, the voice recognition module 263 may be embodied by an element of the display apparatus 20 separated from the CPU, for example, by a microcomputer (MICOM) or the like separate chip as a dedicated processor for the voice recognition function.

According to an embodiment, the processor 260 may receive information about a user voice from the electronic apparatus 10 provided as the external apparatus through the communicator 240 based on the identified change in the display apparatus 20 from the turned-off state (i.e. the standby mode) to the turned-on state (i.e. the normal mode), process the user voice, and control the display 230 to display an image based on a process result.

According to an embodiment, the operation of the processor 260 may be embodied by a computer program stored in the computer program product (not shown) provided separately from the display apparatus 20. In this case, the computer program product includes a memory in which an instruction corresponding to a computer program is stored, and a processor. When the instruction is executed by the processor 260, the instruction includes receiving information about a user voice from the electronic apparatus 10 provided as the external apparatus through the communicator 240 based on the identified change in the display apparatus 20 from the turned-off state (i.e. the standby mode) to the turned-on state (i.e. the normal mode), processing the user voice, and controlling the display 230 to display an image based on a process result.

Therefore, the processor 260 of the display apparatus 20 may download and execute a computer program stored in a separate computer program product, and perform the foregoing operations of the instructions.

The user input receiver 270 transmits various preset control commands or unrestricted information to the processor 260 in response to a user input.

The user input receiver 270 include a control panel (or an input panel) provided as a keypad including a power key, a numeral key, a menu key and the like buttons provided on the main body of the display apparatus 20.

According to an embodiment, the user input receiver 270 includes an input device that generates a command/data/information/signal previously set for remotely controlling the display apparatus 20, and transmits the command/data/information/signal to the display apparatus 20. The input device includes a remote controller, a keyboard, a mouse, etc. and receives a user input as being separated from the main body of the display apparatus 20. The remote controller may include a touch sensor to detect a user's touch input and/or a motion sensor to detect its own motion caused by a user. The input device includes a smartphone or the like terminal in which a remote control application is installed. In this case, it is possible to receive a user's touch input through a touch screen.

The input device serves as the external apparatus capable of performing wireless communication with the main body of the display apparatus 20, and the wireless communication includes Bluetooth, IrDA, RF communication, WLAN, Wi-Fi direct, etc.

According to an embodiment, the user input receiver 270 may further include a microphone to receive a voice uttered by a user/the sound, in other words, a user voice, and the microphone may be provided in the main body of the display apparatus 20, the remote controller, etc.

Below, embodiments that the user voice is processed in the electronic apparatus or the display apparatus according to the disclosure will be described with reference to the accompanying drawings.

Figure 5:
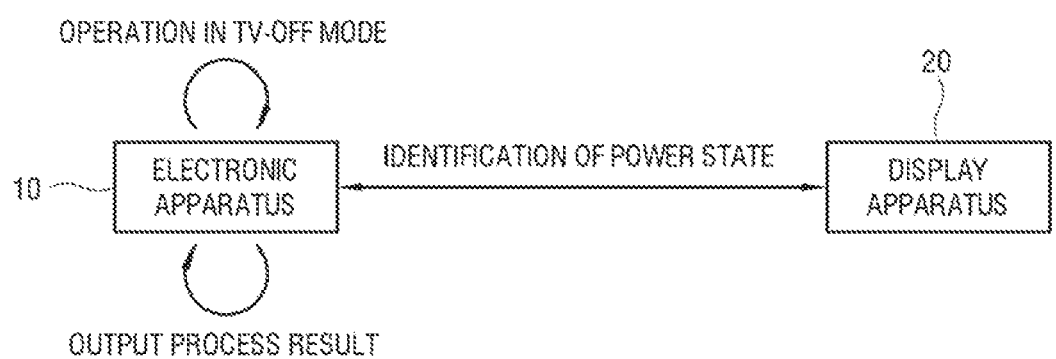
FIG. 5 conceptually illustrates an example of operation between an electronic apparatus and a display apparatus according to a first embodiment of the disclosure.
Figure 6:
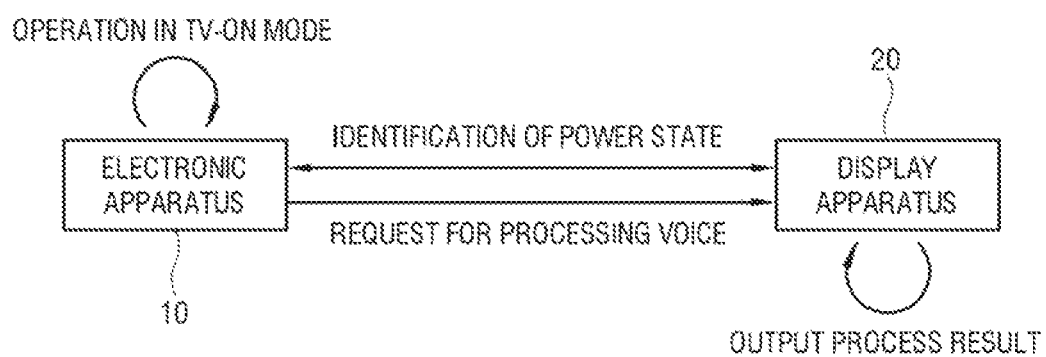
FIG. 6 conceptually illustrates another example of operation between an electronic apparatus and a display apparatus according to a first embodiment of the disclosure.
Figure 7:
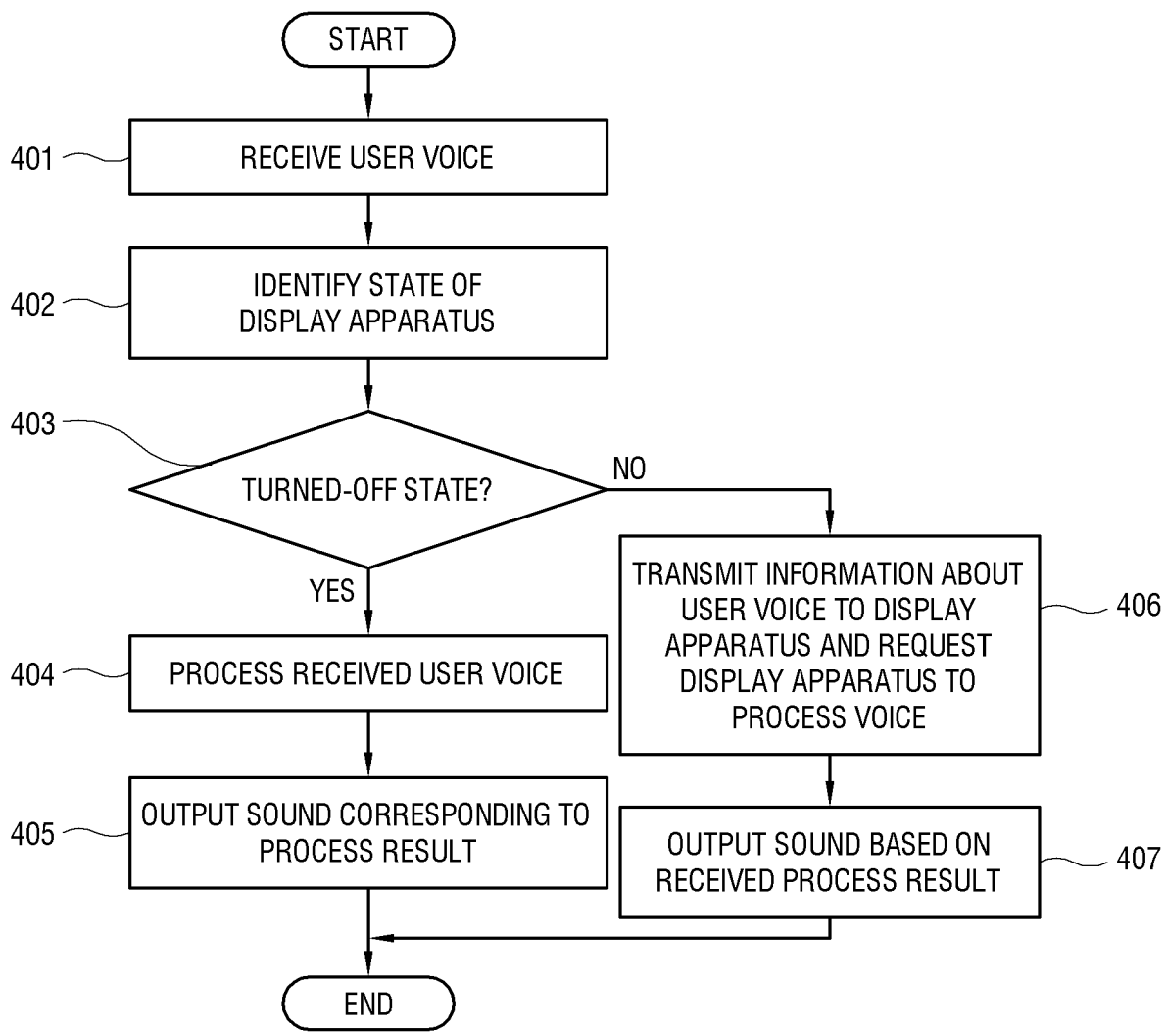
FIG. 7 is a flowchart showing a method of controlling the electronic apparatus according to the first embodiment of the disclosure.
Figure 8:
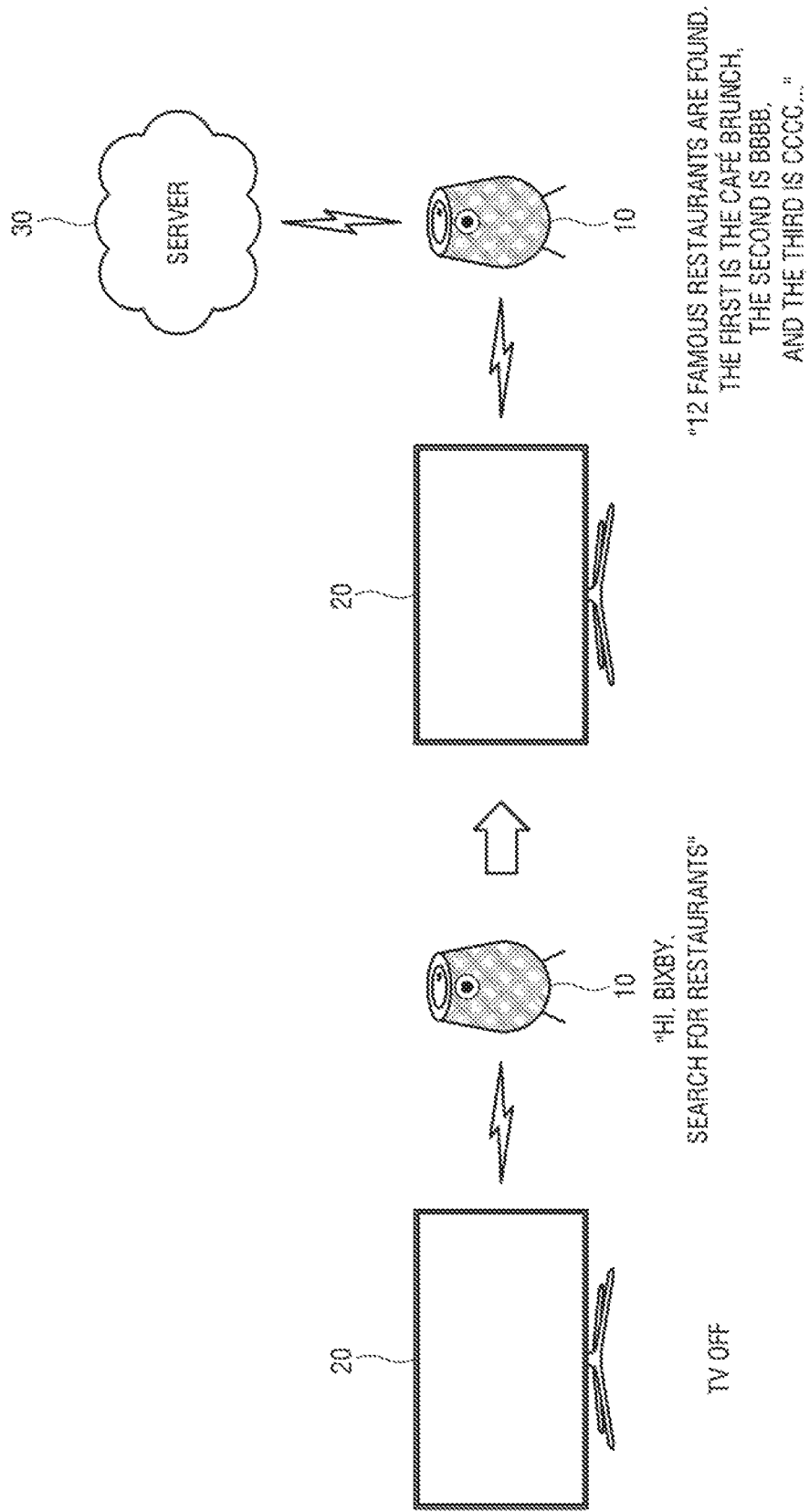
FIG. 8 illustrates an example that the electronic apparatus according to the first embodiment of the disclosure processes a user voice.
Figure 9:
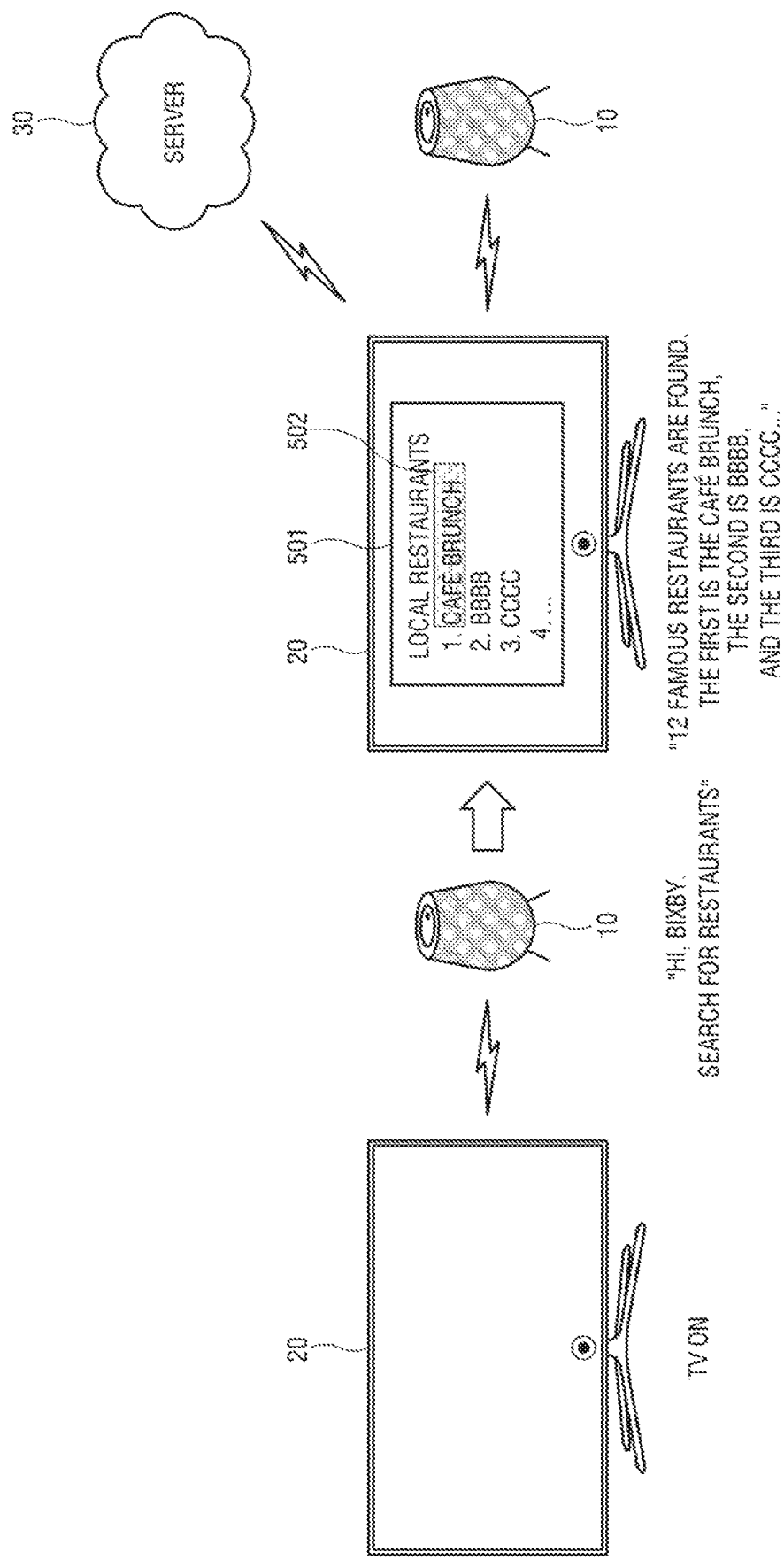
FIG. 9 illustrates an example that the display apparatus according to the first embodiment of the disclosure processes a user voice.

FIGS. 5 and 6 conceptually illustrate operation between an electronic apparatus and a display apparatus according to a first embodiment of the disclosure, FIG. 7 is a flowchart showing a method of controlling the electronic apparatus according to the first embodiment of the disclosure, FIG. 8 illustrates an example that the electronic apparatus according to the first embodiment of the disclosure processes a user voice, and FIG. 9 illustrates an example that the display apparatus according to the first embodiment of the disclosure processes a user voice.

The electronic apparatus 10 according to the first embodiment of the disclosure may, as shown in FIGS. 5 and 6, identify the power state of the display apparatus 20, i.e. whether the display apparatus 20 is in the turned-on state or the turned-off state, based on the user voice received through the microphone 120, and operate in a TV-off mode or a TV-on mode based on the identification result.

The electronic apparatus 10 may operate in the TV-off mode (or an exclusive use mode) as shown in FIG. 5 based on the identified turned-off state of the display apparatus 20, thereby processing the received user voice and outputting a process result as a sound through the speaker 110.

The electronic apparatus 10 may operate in the TV-on mode (or a TV link mode) as shown in FIG. 6 based on the identified turned-on state of the display apparatus 20, thereby transmitting the information about the received user voice to the display apparatus 20 through the communicator 140, and making a request for processing the voice to the display apparatus 20. The display apparatus 20 processes the user voice, and outputs a process result as an image through the display 230.

Specifically, as shown in FIG. 7, the electronic apparatus 10 may receive a user voice uttered by a user through the microphone 120 (401). The electronic apparatus 10 may receive various unrestricted user voices through the microphone 120, and may for example, as shown in FIG. 8, receive a voice corresponding to a searching request.

According to an embodiment, the processor 160 may detect a predetermined keyword uttered by a user (hereinafter, referred to as a wake-up keyword), for example, "Hi, Bixby" as shown in FIG. 8, thereby identifying that the user voice is received through the microphone 120. One or more wake-up keywords may be previously set by the manufacturer of the electronic apparatus 10, a service provider, etc. or may be set by a user.

Here, when it is identified that a predetermined keyword is input as the user voice through the microphone 120, the processor 160 may execute or activate the AI speaker application installed in the electronic apparatus 10. For example, when it is identified that "Hi, Bixby" or the like wake-up keyword is input, the processor 160 may switch the running state of the AI speaker application over from the background mode to the foreground mode.

Based on the user voice received in the operation 401, the processor 160 identifies the state of the external apparatus, i.e. the display apparatus 20 through the communicator 140 (402). For example, the processor 160 transmits a preset signal to the display apparatus 20 through the communicator 140, and identify the power state of the display apparatus 20, in other words, whether the display apparatus 20 is in the turned-on or turned-off state, according to whether a response signal to the preset signal is received from the display apparatus 20.

Based on the identification in the operation 402, it may be identified that the display apparatus 20 is in the turned-on state or the turned-off state (403).

When it is identified in the operation 403 that the display apparatus 20 is in the turned-off state, the processor 160 may process the user voice received in the operation 401 (404).

Specifically, the electronic apparatus 10 may operate in the TV-off mode, so that the processor 160 can apply the voice recognition to the user voice and process the user voce to thereby perform an operation based on a result of the voice recognition.

The processor 160 may control the signal processor 130 to convert the user voice, i.e. a sound wave received through the microphone 120 into an electric signal.

According to an embodiment, the voice recognition module 161 of the processor 160 may perform the voice recognition by extracting a vector of voice features from a signal of a converted user voice, and comparing the extracted vector with the acoustic model of the server 30 or the database 151.

The processor 160 performs operations to process the user voice based on the foregoing voice recognition, and output the process result.

For example, as shown in FIG. 8, when the user voice is related to a request for searching for local restaurants, the processor 160 may perform searching through the communicator 140, and control the signal processor 130 to generate an audio feedback, i.e. a response voice based on the process result (i.e. a searching result).

The processor 160 may output a sound corresponding to the process result of the operation 404 through the speaker 110 (405). For example, when the user voice processed in the operation 404 is related to a request for searching for local restaurants, a sound based on the searching result is output through the speaker 110 as shown in FIG. 8. This sound corresponds to the response voice generated in the operation 404.

Meanwhile, when it is identified in the operation 403 that the display apparatus 20 is in the turned-on state, the processor 160 may transmit information about the user voice received in the operation 401 to the display apparatus 20 and makes a request for processing the voice to the display apparatus 20 (406).

Here, the electronic apparatus 10 operates in the TV-on mode, so that the processor 160 can control the signal processor 130 to convert the user voice, i.e. a soundwave received through the microphone 120 into an electric signal, and transmit data about the converted signal as the information about the user voice to the display apparatus 20 through the communicator 140.

The processor 260 of the display apparatus 20 may apply the voice recognition to the user voice, and process the user voice to thereby perform an operation based on a result of the voice recognition. Here, when the information about the user voice is received from the electronic apparatus 10, the processor 260 may execute or activate the AI speaker application installed in the display apparatus 20, in which the activation include switching over the running state of the AI speaker application from the background mode to the foreground mode.

According to an embodiment, the voice recognition module 263 of the processor 260 extracts a vector of voice features from information about the received user voice, and compares the extracted vector with the acoustic model of the database 251 or the server 30, thereby performing the voice recognition.

The processor 260 of the display apparatus 20 performs operations to process the user voice based on the voice recognition as described above, and output the process result.

For example, as shown in FIG. 9, when the user voice is related to a request for searching for local restaurants, the processor 260 may perform searching through the communicator 240, and control the display 230 to display a UI 501 showing the search result. Here, a plurality of items 502 selectable by a user may be listed in the UI 501 showing the search result. When a user selects one item 502 in the list, the processor 260 may control the display 230 to display additional information about the selected item, for example, a map, contact information, user reviews, etc., thereby allowing the user to further obtain various pieces of information.

FIG. 9 shows an example that the request for searching for restaurants or the like is received as the user voice and the searching results are displayed, but there are no limits to a target to be processed or searched based on the user voice according to the disclosure. For example, various user voices related to a TV service such as TV channel searching, program/content searching, etc. may be processed.

Further, the processor 260 may output a signal corresponding to the process result (or the searching result) to the electronic apparatus 10 through the communicator 240.

The processor 160 of the electronic apparatus 10 may receive the process result of the operation 406 from the display apparatus 20, and output a corresponding sound through the speaker 110 (407). For example, when the process for the user voice in the operation 406 includes searching for local restaurants or the like, the searching result may be not only displayed on the display apparatus 20 but also output as a sound corresponding to the audio feedback, i.e. the response voice through the speaker 110 as shown in FIG. 9.

According to the first embodiment of the disclosure, the electronic apparatus 10 autonomously processes the user voice or allows the external apparatus, i.e. the display apparatus 20 to selectively process the user voice according to whether the external apparatus, i.e. the display apparatus 20 with which the electronic apparatus 10 can communicate is in the turned-off state or the turned-on state. Therefore, as compared with the case where only the audio feedback is given through the electronic apparatus 10, the visual feedback is further provided through the screen of the display apparatus 20, thereby improving a user's accessibility to the process result, and increasing convenience as additional information is more easily obtained as necessary.

Figure 10:
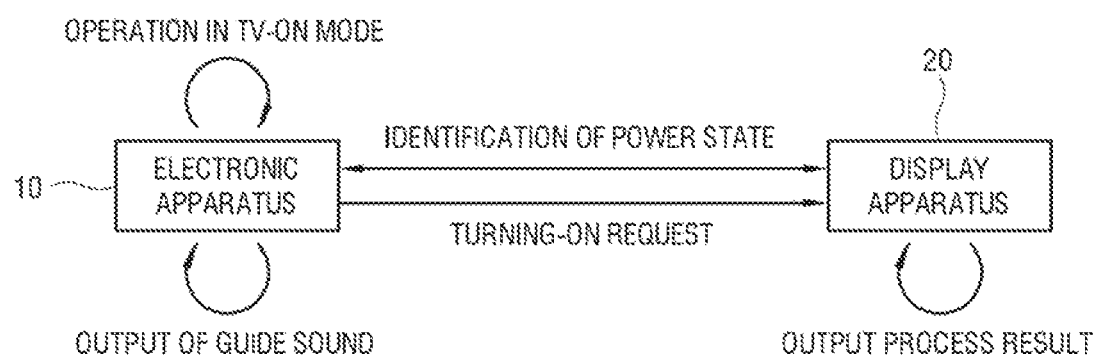
FIG. 10 conceptually illustrates operation between an electronic apparatus and a display apparatus according to a second embodiment of the disclosure.
Figure 11:
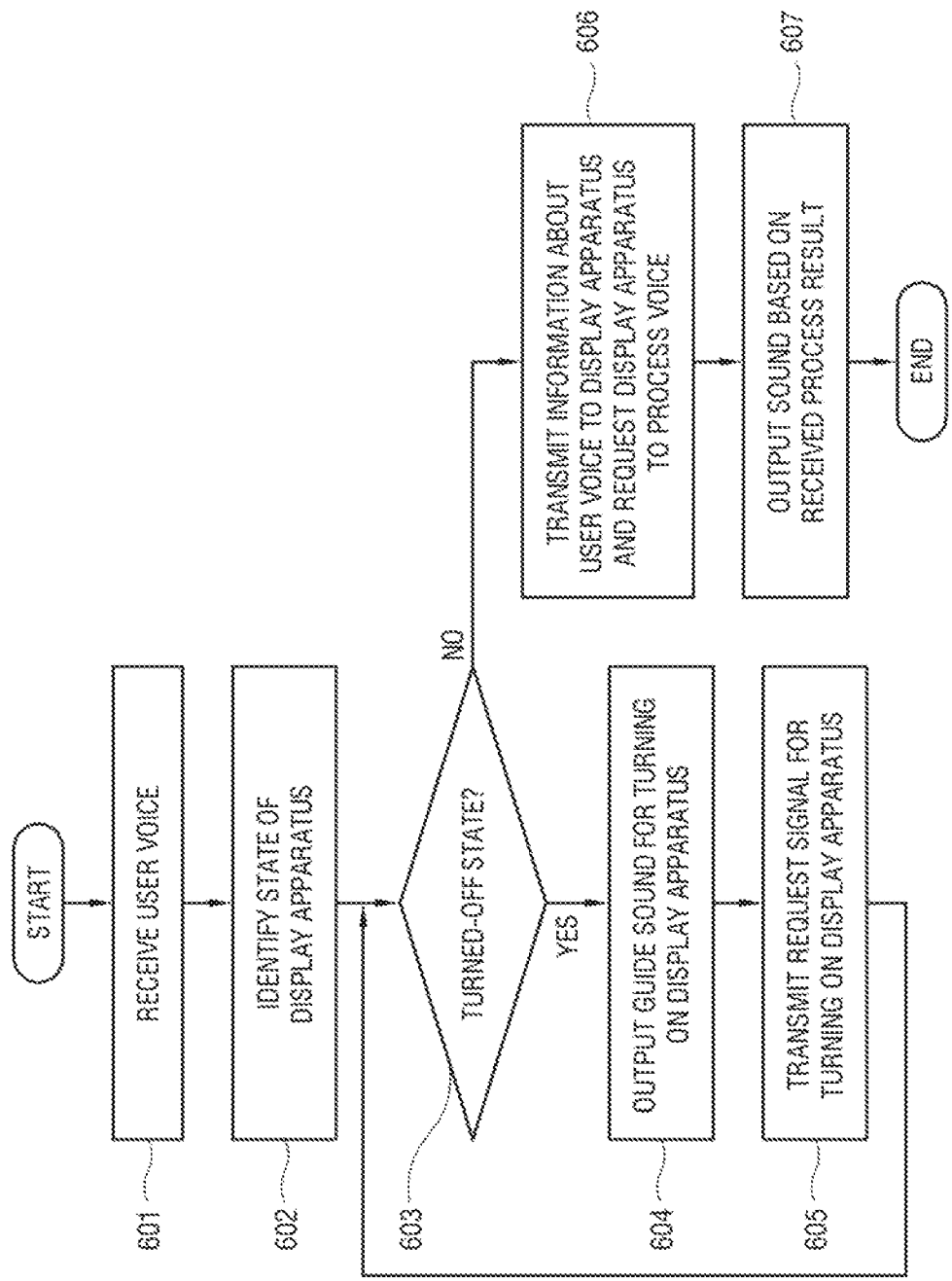
FIG. 11 is a flowchart showing a method of controlling the electronic apparatus according to the second embodiment of the disclosure.

FIG. 10 conceptually illustrates operation between an electronic apparatus and a display apparatus according to a second embodiment of the disclosure, and FIG. 11 is a flowchart showing a method of controlling the electronic apparatus according to the second embodiment of the disclosure.

The electronic apparatus 10 according to the second embodiment of the disclosure may, as shown in FIG. 10, identify the power state of the display apparatus 20, i.e. whether the display apparatus 20 is in the turned-on state or the turned-off state, based on the user voice received through the microphone 120, and transmit a request for turning on the display apparatus 20 when it is identified that the display apparatus 20 is in the turned-off mode.

Here, the electronic apparatus 10 may output a sound for guiding a user to turn on the display apparatus 20 of the turned-on state through the speaker 110, and the display apparatus 20 may be switched over from the turned-off state to the turned-on state in response to the request from the electronic apparatus 10.

The electronic apparatus 10 operates in the TV-on mode (or the TV link mode) as shown in FIG. 10 based on the switching of the display apparatus 20 from the turned-off state to the turned-on state. The electronic apparatus 10 operates in the TV-on mode, thereby transmitting the information about the received user voice to the display apparatus 20 through the communicator 140, and making a request for processing the voice to the display apparatus 20. The display apparatus 20 processes the user voice, and outputs a process result as an image through the display 230.

Specifically, as shown in FIG. 11, the electronic apparatus 10 may receive a user voice uttered by a user through the microphone 120 (601). Here, the electronic apparatus 10 may receive various unrestricted user voices through the microphone 120.

According to an embodiment, the processor 160 may detect a predetermined keyword uttered by a user (i.e. the wake-up keyword), thereby identifying that the user voice is received through the microphone 120.

When it is identified that a predetermined keyword is input as the user voice through the microphone 120, the processor 160 may execute or activate the AI speaker application installed in the electronic apparatus 10, in which the activation includes switching over the running state of the AI speaker application from the background mode to the foreground mode.

Based on the user voice received in the operation 601, the processor 160 identifies the state of the external apparatus, i.e. the display apparatus 20 through the communicator 140 (602). For example, the processor 160 transmits a preset signal to the display apparatus 20 through the communicator 140, and identify the power state of the display apparatus 20, in other words, whether the display apparatus 20 is in the turned-on or turned-off state, according to whether a response signal to the preset signal is received from the display apparatus 20.

Based on the identification in the operation 602, it may be identified that the display apparatus 20 is in the turned-on state or the turned-off state (603).

When it is identified in the operation 603 that the display apparatus 20 is in the turned-off state, the processor 160 according to an embodiment may output a sound for guiding a user to turn on the display apparatus 20 through the speaker 110 (604). According to the disclosure, there are no limits to the guide sound to be output, and the guide sound may for example include content for guiding a user to press a specific button of the electronic apparatus 10 so that a turning-on request can be transmitted to the display apparatus 20, or content for guiding a user to turn on the display apparatus 20.

Alternatively, the operation 604 of outputting the guide sound may be omitted in the electronic apparatus 10.

When it is identified in the operation 603 that the display apparatus 20 is in the turned-off state, the processor 160 may control the communicator 140 to transmit a request signal for turning on the display apparatus 20 to the display apparatus 20 (605).

According to an embodiment, when a user presses the specific button in response to the output of the guide sound for the press of the corresponding button in the operation 604, the processor 160 may for example transmit a request signal for turning on the display apparatus 20 through the communicator 140.

According to another embodiment, when it is identified that the display apparatus 20 is in the turned-off state, the processor 160 may directly transmit the request signal for turning on the display apparatus 20 through the communicator 140 without the output of the guide sound in the operation 604 or a user's control.

The turning-on request signal in the operation 605 is received in the display apparatus 20, so that the display apparatus 20 can be switched over from the turned-off state to the turned-on state in response to the reception. The processor 260 of the display apparatus 20 may control the communicator 250 to transmit a signal for informing that the display apparatus 20 is turned on to the electronic apparatus 10, and therefore a feedback signal to the turning-on request is transmitted to the electronic apparatus 10.

When it is identified in the operation 603 that the display apparatus 20 is in the turned-on state, the processor 160 may transmit information about the user voice received in the operation 601 to the display apparatus 20 and makes a request for processing the voice to the display apparatus 20 (606). The processor 160 may identify that the display apparatus 20 is in the turned-on state, based on the response signal from the display apparatus 20. According to an embodiment, the response signal may correspond to the feedback signal to the foregoing turning-on request.

Here, the electronic apparatus 10 operates in the TV-on mode, so that the processor 160 can control the signal processor 130 to convert the user voice, i.e. a soundwave received through the microphone 120 in the operation 601 into an electric signal, and transmit data about the converted signal as the information about the user voice to the display apparatus 20 through the communicator 140.

The processor 260 of the display apparatus 20 may apply the voice recognition to the user voice, and process the user voice to thereby perform an operation based on a result of the voice recognition. Here, when the information about the user voice is received from the electronic apparatus 10, the processor 260 may execute or activate the AI speaker application installed in the display apparatus 20, in which the activation include switching over the running state of the AI speaker application from the background mode to the foreground mode.

According to an embodiment, the voice recognition module 263 of the processor 260 extracts a vector of voice features from information about the received user voice, and compares the extracted vector with the acoustic model of the database 251 or the server 30, thereby performing the voice recognition.

The processor 260 of the display apparatus 20 processes the user voice based on the voice recognition as described above, and display the process result on the display 230 as shown in FIG. 9. Further, the processor 260 may output a signal corresponding to the process result (i.e. the search result) to the electronic apparatus 10 through the communicator 140.

The processor 160 of the electronic apparatus 10 may receive the process result of the operation 606 from the display apparatus 20, and output a corresponding sound through the speaker 110 (607). Thus, the result of processing the user voice in the operation 606 may be not only displayed on the display apparatus 20 but also output as a sound corresponding to the audio feedback, i.e. the response voice through the speaker 110.

According to the second embodiment of the disclosure, when the external apparatus, i.e. the display apparatus 20 with which the electronic apparatus 10 can communicate is in the turned-off state, the electronic apparatus 10 controls the external apparatus, i.e. the display apparatus 20 to be turned on to process the user voice. Therefore, as compared with the case where only the audio feedback is given through the electronic apparatus 10, the visual feedback is further provided through the screen of the display apparatus 20, thereby improving a user's accessibility to the process result, and increasing convenience as additional information is more easily obtained as necessary.

Figure 12:
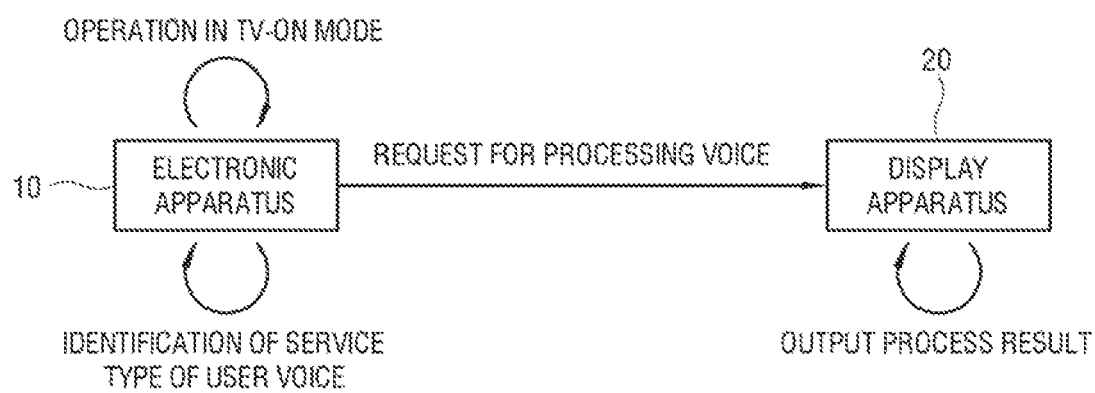
FIG. 12 conceptually illustrates operation between an electronic apparatus and a display apparatus according to a third embodiment of the disclosure.
Figure 13:
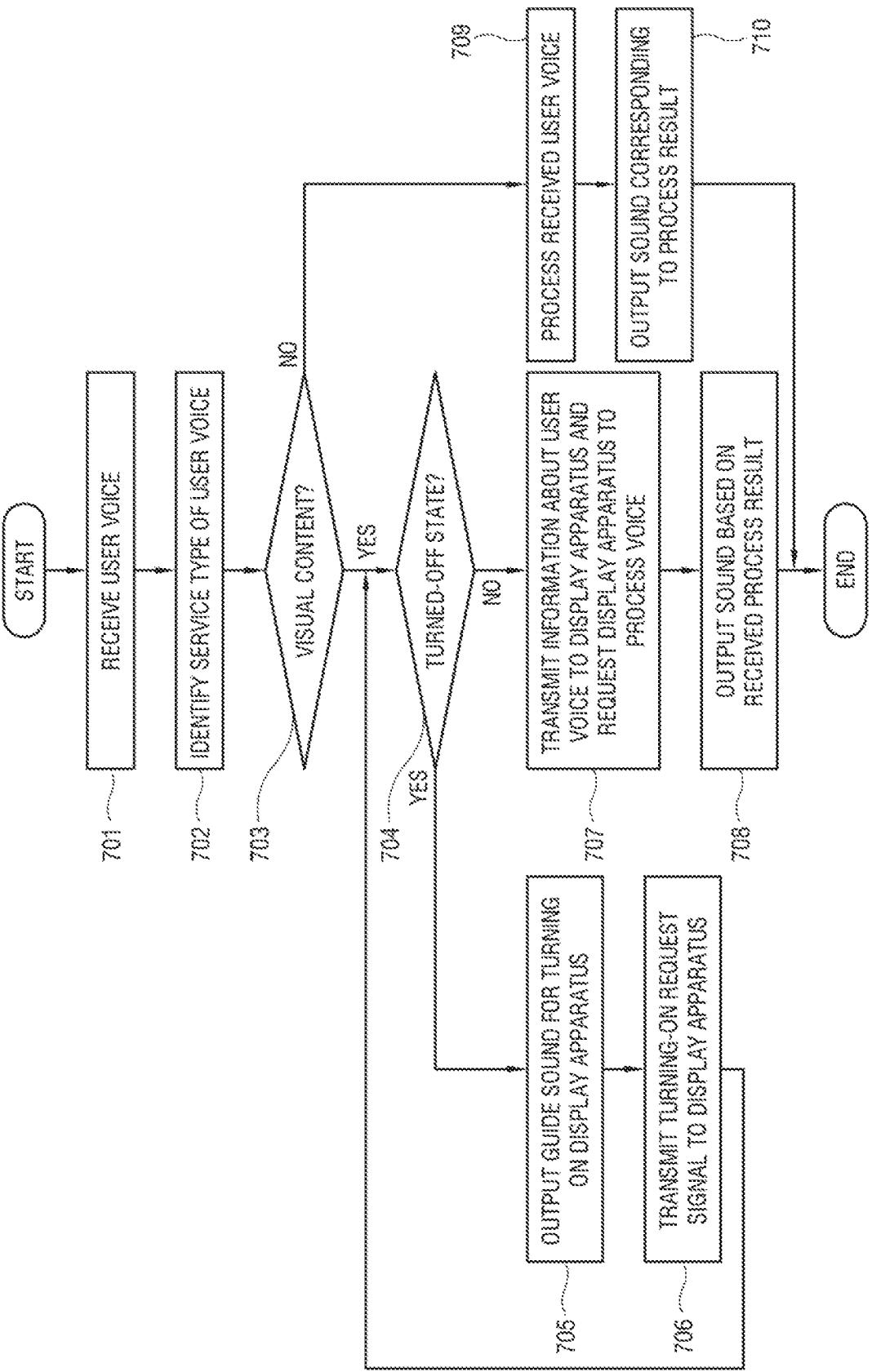
FIG. 13 is a flowchart showing a method of controlling the electronic apparatus according to the third embodiment of the disclosure.

FIG. 12 conceptually illustrates operation between an electronic apparatus and a display apparatus according to a third embodiment of the disclosure, and FIG. 13 is a flowchart showing a method of controlling the electronic apparatus according to the third embodiment of the disclosure.

The electronic apparatus 10 according to the third embodiment of the disclosure may, as shown in FIG. 12, identify a service type (or a content type) related to a user voice, based on the user voice received through the microphone 120, and autonomously processes the user voice or requests the display apparatus 20 to process the user voice based on the identification result.

For example, when it is identified that the received user voice is related to services of providing acoustic content, i.e. audio/sound, for example, music play, a weather report, current time, a timer, etc., the electronic apparatus 10 may autonomously process the corresponding voice.

In this case, the electronic apparatus 10 operates in the TV-off mode, thereby autonomously processing the user voice and outputting the process result through the speaker 110.

On the other hand, when it is identified that the received user voice is related to services of providing visual content, i.e. video/image, for example a movie, a TV program, etc., the electronic apparatus 10 may request the display apparatus 20 to process the corresponding voice.

In this case, the electronic apparatus 10 may transmits a request signal for processing the voice to the display apparatus 20, and thus operates in the TV-on mode (i.e. the TV link mode) as shown in FIG. 12. The electronic apparatus 10 operates in the TV-on mode, thereby transmitting the information about the received user voice to the display apparatus 20 through the communicator 140, and making a request for processing the voice to the display apparatus 20. The display apparatus 20 processes the user voice, and outputs a process result as an image through the display 230.

Specifically, as shown in FIG. 13, the electronic apparatus 10 may receive a user voice uttered by a user through the microphone 120 (701). Here, the electronic apparatus 10 may receive various unrestricted user voices through the microphone 120.

According to an embodiment, the processor 160 may detect a predetermined keyword uttered by a user (i.e. the wake-up keyword), thereby identifying that the user voice is received through the microphone 120.

When it is identified that a predetermined keyword is input as the user voice through the microphone 120, the processor 160 may execute or activate the AI speaker application installed in the electronic apparatus 10, in which the activation includes switching the running state of the AI speaker application over from the background mode to the foreground mode.

Based on the user voice received in the operation 701, the processor 160 identifies the service type of the received user voice (702). For example, the processor 160 identifies whether the user voice is related to the service of visual content such as a movie, a TV program, etc. or acoustic content such as music, weather, time, a timer, etc.

Based on the identification of the operation 702, the service type of the user voice is identified as the service of the visual content or the service of the acoustic content (703).

When it is identified in the operation 703 that the service type of the user voice is related to the visual content, the processor 160 may identify whether the display apparatus 20 is in the turned-off state or the turned-on state (704). For example, the processor 160 transmits a preset signal to the display apparatus 20 through the communicator 140, and identify the power state of the display apparatus 20, in other words, whether the display apparatus 20 is in the turned-on or turned-off state, according to whether a response signal to the preset signal is received from the display apparatus 20.

When it is identified in the operation 704 that the display apparatus 20 is in the turned-off state, the processor 160 may output a sound for guiding a user to turn on the display apparatus 20 through the speaker 110 (705). According to the disclosure, there are no limits to the guide sound to be output, and the guide sound may for example include content for guiding a user to press a specific button so that turning-on request can be transmitted to the display apparatus 20 of the electronic apparatus 10.

Alternatively, the operation 705 of outputting the guide sound may be omitted in the electronic apparatus 10.

When it is identified in the operation 704 that the display apparatus 20 is in the turned-off state, the processor 160 may control the communicator 140 to transmit a request signal for turning on the display apparatus 20 to the display apparatus 20 (706).

According to an embodiment, when a user presses the specific button in response to the output of the guide sound for the press of the corresponding button in the operation 705, the processor 160 may for example transmit a request signal for turning on the display apparatus 20 through the communicator 140.

According to another embodiment, when it is identified that the display apparatus 20 is in the turned-off state, the processor 160 may directly transmit the request signal for turning on the display apparatus 20 through the communicator 140 without the output of the guide sound in the operation 705 or a user's control.

The turning-on request signal in the operation 706 is received in the display apparatus 20, so that the display apparatus 20 can be switched over from the turned-off state to the turned-on state in response to the reception. The processor 260 of the display apparatus 20 may control the communicator 250 to transmit a signal for informing that the display apparatus 20 is turned on to the electronic apparatus 10, and therefore a feedback signal to the turning-on request is transmitted to the electronic apparatus 10.

When it is identified in the operation 704 that the display apparatus 20 is in the turned-on state, the processor 160 may transmit information about the user voice received in the operation 701 to the display apparatus 20 and makes a request for processing the voice to the display apparatus 20 (707). The processor 160 may identify that the display apparatus 20 is in the turned-on state, based on the response signal from the display apparatus 20. According to an embodiment, the response signal may correspond to the feedback signal to the foregoing turning-on request.

Here, the processor 160 operates in the TV-on mode, and thus controls the signal processor 130 to convert the user voice, i.e. a soundwave received through the microphone 120 in the operation 701 into an electric signal, and transmit data about the converted signal as the information about the user voice to the display apparatus 20 through the communicator 140.

The processor 260 of the display apparatus 20 may apply the voice recognition to the user voice, and process the user voice to thereby perform an operation based on a result of the voice recognition. Here, when the information about the user voice is received from the electronic apparatus 10, the processor 260 may execute or activate the AI speaker application installed in the display apparatus 20, in which the activation include switching over the running state of the AI speaker application from the background mode to the foreground mode.

According to an embodiment, the voice recognition module 263 of the processor 260 extracts a vector of voice features from information about the received user voice, and compares the extracted vector with the acoustic model of the database 251 or the server 30, thereby performing the voice recognition.

The processor 260 of the display apparatus 20 processes the user voice based on the voice recognition as described above, and display the process result, for example, on the display 230 as shown in FIG. 9. Further, the processor 260 may output a signal corresponding to the process result (i.e. the search result) to the electronic apparatus 10 through the communicator 140.

The processor 160 of the electronic apparatus 10 may receive the process result of the operation 707 from the display apparatus 20, and output a corresponding sound through the speaker 110 (708). Thus, the result of processing the user voice in the operation 707 may be not only displayed on the display apparatus 20 but also output as a sound corresponding to the audio feedback, i.e. the response voice through the speaker 110.

Meanwhile, when it is identified in the operation 703 that the service type of the user voice is related to the acoustic content, the processor 160 may process the user voice received in the operation 701 (709).

Specifically, the electronic apparatus 10 operates in the TV-off mode, and thus the processor 160 applies the voice recognition to the user voice, and performs a process related to the user voice so that an operation based on the result of the voice recognition can be performed.

The processor 160 may control the signal processor 130 to convert the user voice, i.e. the sound wave received through the microphone 120 into an electric signal.

According to an embodiment, the voice recognition module 161 of the processor 160 extracts a vector of voice features from the signal converted from the user voice, and compares the extracted vector with the acoustic model of the server 30 or the database 151, thereby performing the voice recognition.

The processor 160 performs operations to process the user voice based on the foregoing voice recognition, and output the process result.

For example, when the user voice is related to a request for playing a certain genre, for example, classic music, the processor 160 may search for music of the corresponding genre through the communicator 140.

The processor 160 may output a sound corresponding to the process result of the operation 709 through the speaker 110 (710). For example, when the user voice processed in the operation 709 is identified as a request for playing classic music, the speaker 110 may be controlled to output a sound, i.e. play music based on the process result (i.e. the searching result).

According to the third embodiment of the disclosure as described above, the electronic apparatus 10 can process the user voice through the display apparatus 20 when the service type of the user voice is related to the visual content. Therefore, it is more convenient for a user because the user can more efficiently receive a service, i.e. content through the screen of the display apparatus 20.

Figure 14:
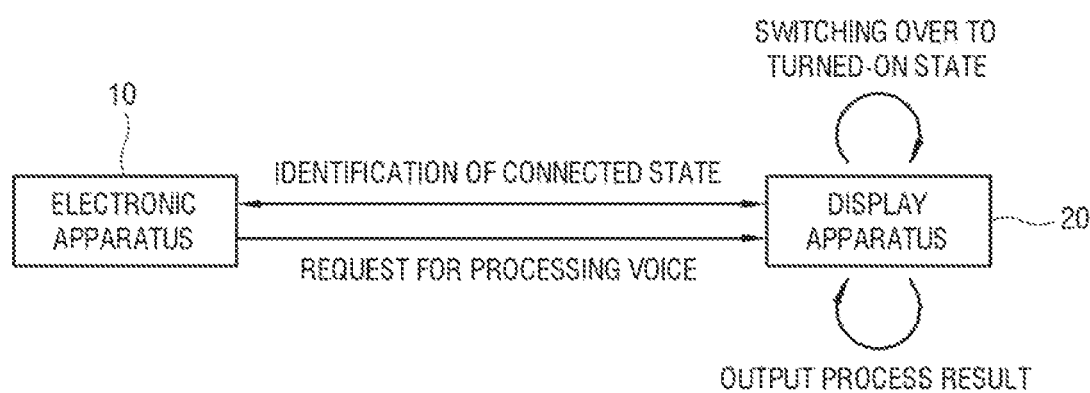
FIG. 14 conceptually illustrates operation between an electronic apparatus and a display apparatus according to a fourth embodiment of the disclosure.
Figure 15:
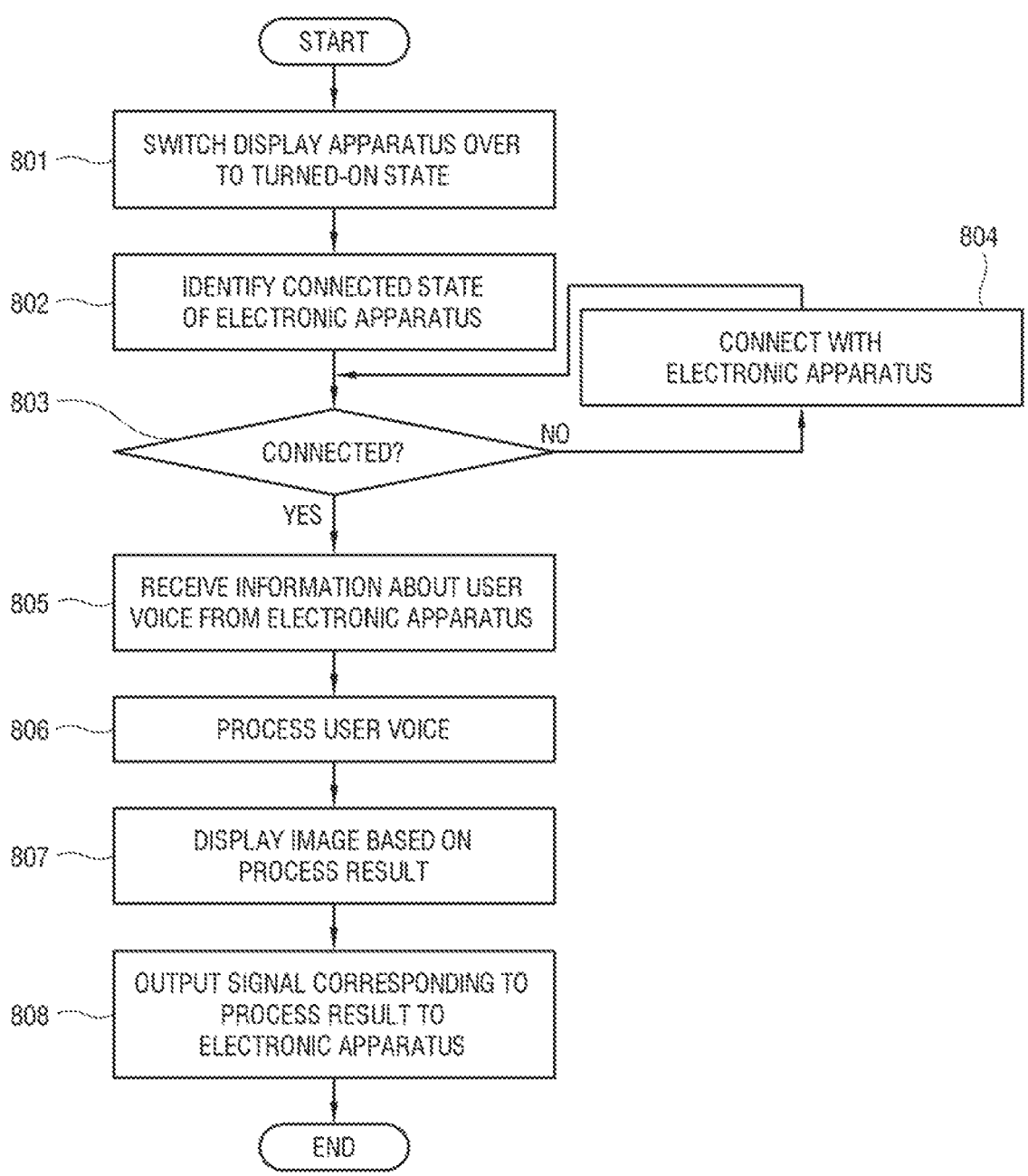
FIG. 15 is a flowchart showing a method of controlling the electronic apparatus according to the fourth embodiment of the disclosure.

FIG. 14 conceptually illustrates operation between an electronic apparatus and a display apparatus according to a fourth embodiment of the disclosure, and FIG. 15 is a flowchart showing a method of controlling the electronic apparatus according to the fourth embodiment of the disclosure.

The display apparatus 20 according to the fourth embodiment of the disclosure may, as shown in FIG. 14, identify a connection state between the electronic apparatus 10 and the display apparatus 20, i.e. whether or not the display apparatus 20 and the electronic apparatus 10 are connected for the wired or wireless communication, based on change of the display apparatus 20 from the turned-off state to the turned-on state, and receive a request for processing the user voice from the electronic apparatus 10 when it is identified that the display apparatus 20 and the electronic apparatus 10 are connected.

Here, when it is identified that the display apparatus 20 and the electronic apparatus 10 are not connected, the display apparatus 20 performs connection settings for the communication with the electronic apparatus 10, and then receive the request for processing the voice from the connected electronic apparatus 10.

The electronic apparatus 10 operates in the TV-on mode, thereby transmitting the information about the user voice to the display apparatus 20, and making a request for processing the voice to the display apparatus 20. The display apparatus 20 may, as shown in FIG. 14, process the user voice, and output a process result as an image through the display 230.

Specifically, as shown in FIG. 15, the display apparatus 20 may be switched over from the turned-off state to the turned-on state (801).

Here, the turned-off state refers to a kind of soft turned-off state in which the display apparatus 20 operates in the standby mode of receiving the standby power. As the first processor 261 of the turned-off state is woken up by the second processor 262, the display apparatus 20 is switched over to the turned-on state, in other words, the normal mode.

According to an embodiment, when the first processor 261 is in the power-saving state, i.e. the turned-off state, the second processor 262 may identify whether a user input is received through the user input receiver 270, and identify the change of the display apparatus 20 from the turned-off state to the turned-on state based on the received user input according to identification results. Here, the received user input may for example be based on a user's control responding to the guide sound for turning on the display apparatus, which is output in the operation 604 according to the embodiment of FIG. 11.

According to another embodiment, when the first processor 261 is in the power-saving state, i.e. the turned-off state, the second processor 262 may identify that a request signal for turning on the display apparatus 20 is received from the electronic apparatus 10 through the communicator 240, and identify that the display apparatus 20 is switched over from the turned-off state to the turned-on state based on the received signal according to the identification results. Here, the received request signal may for example be based on a signal transmitted in the operation 605 according to the embodiment of FIG. 11.

When the display apparatus 20 is switched over to the turned-on state in the operation 801, the first processor 261 is woken up and identifies the connection state of the external apparatus, i.e. the electronic apparatus 10 through the communicator 140 (802). For example, the first processor 260 may transmit a preset signal to the electronic apparatus 10 through the communicator 140, and identify whether the display apparatus 20 and the electronic apparatus 10 are connected for the wired or wireless communication based on whether the response signal to the preset signal is received from the electronic apparatus 10.

Based on the identification in the operation 802, it is identified whether the display apparatus 20 and the electronic apparatus 10 are connected, in other words, whether they are in a connected state or a disconnected state (803).

When it is identified in the operation 803 that the display apparatus 20 is not connected to the electronic apparatus 10, the processor 260, i.e. the first processor 261 may perform settings for connection with the electronic apparatus 10 through the communicator 140 (804). Here, there are no limits to the type of communication connection between the display apparatus 20 and the electronic apparatus 10, and the type of communication connection may for example include Bluetooth, Wi-Fi or the like wireless communication connection.

When it is identified in the operation 803 that the display apparatus 20 is connected to the electronic apparatus 10, the processor 260, i.e. the first processor 261 may receive information about the input user voice from the electronic apparatus 10 through the speaker 110 (805). Here, the received information about the user voice may include a request for processing the voice, and may correspond to the information about the user voice transmitted from the electronic apparatus 10 to the display apparatus 20 in the operation 606 according to the embodiment of FIG. 11 or the operation 707 according to the embodiment of FIG. 13.

According to an embodiment, when the information about the user voice is received from the electronic apparatus 10, the processor 260 may execute or activate the AI speaker application installed in the display apparatus 20, in which the activation include switching over the running state of the AI speaker application from the background mode to the foreground mode.

Based on the information about the user voice received in the operation 804, the processor 260 may process the corresponding user voice (806).

Specifically, the processor 260 may apply the voice recognition to the user voice, and process the user voice to perform an operation based on a result of the voice recognition.

According to an embodiment, the voice recognition module 263 of the processor 260 extracts a vector of voice features from information about the received user voice, and compares the extracted vector with the acoustic model of the database 251 or the server 30, thereby performing the voice recognition.

The processor 260 performs operations to process the user voice based on the foregoing voice recognition, and output the process result.

For example, as shown in FIG. 8, when the user voice is related to a request for searching for local restaurants, the processor 260 may perform searching through the communicator 240.

The processor 260 controls the display 230 to display an image corresponding to the process result (i.e. a searching result) in the operation 806 (807). For example, the processor 260 may, as shown in FIG. 8, control the display 230 to display a UI 501 showing the result of searching the local restaurants.

The processor 260 may control the communicator 240 to output a signal corresponding to the process result (i.e. the searching result) in the operation 806 to the electronic apparatus 10 (808). Here, the output signal may correspond to the process result received in the electronic apparatus 10 in the operation 607 according to the embodiment of FIG. 11 or the operation 708 according to the embodiment of FIG. 13.

The processor 160 of the electronic apparatus 10 may receive a signal corresponding to the process result as described above, and output a sound based on the received signal through the speaker 110. Therefore, the result of processing the user voice in the operation 807 may be not only displayed on the display apparatus 20 but also output as an audio feedback through the speaker 110.

According to the fourth embodiment of the disclosure as described above, when the display apparatus 20 is switched over from the turned-off state to the turned-on state, the display apparatus 20 may automatically perform connection settings according to whether it is connected for communication with the external apparatus, i.e. the electronic apparatus 10. Further, the display apparatus 20 receives the information about the user voice from the connected electronic apparatus 10, so that the user voice input to the electronic apparatus 10 can be processed in the display apparatus 20. Therefore, with regard to a user input for which a visual feedback is efficient, a process result is provided as an image through the screen of the display apparatus 20, thereby improving a user's accessibility to the process result, and more easily obtaining additional information as necessary.

Figure 16:
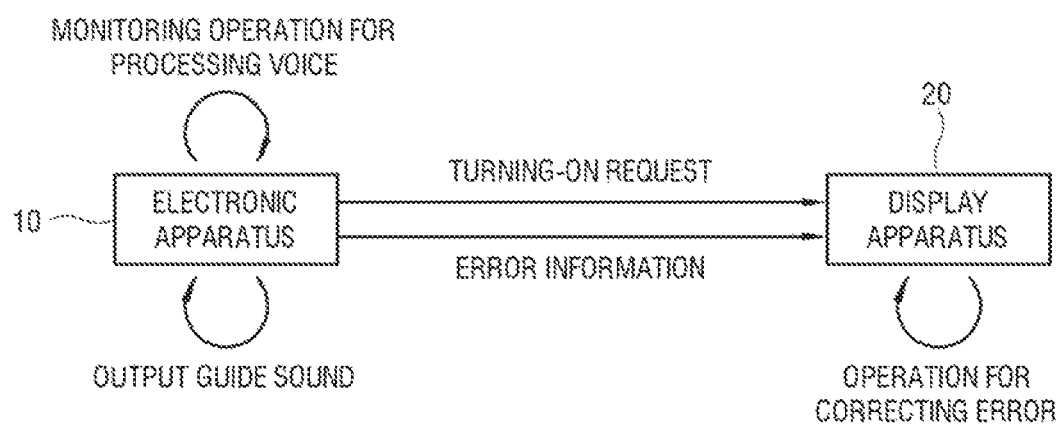
FIG. 16 conceptually illustrates operation between an electronic apparatus and a display apparatus according to a fifth embodiment of the disclosure.
Figure 17:
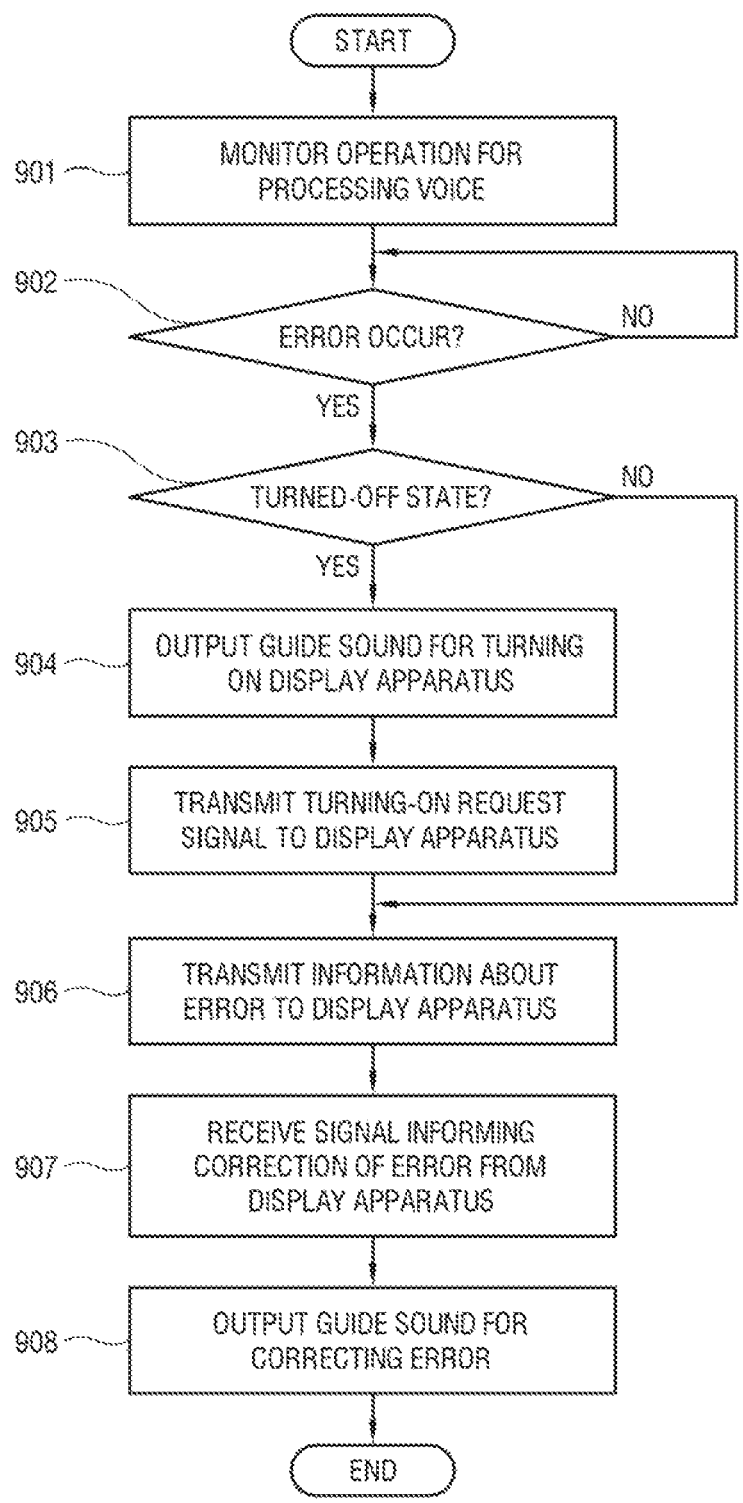
FIG. 17 is a flowchart showing a method of controlling the electronic apparatus according to the fifth embodiment of the disclosure.
Figure 18:
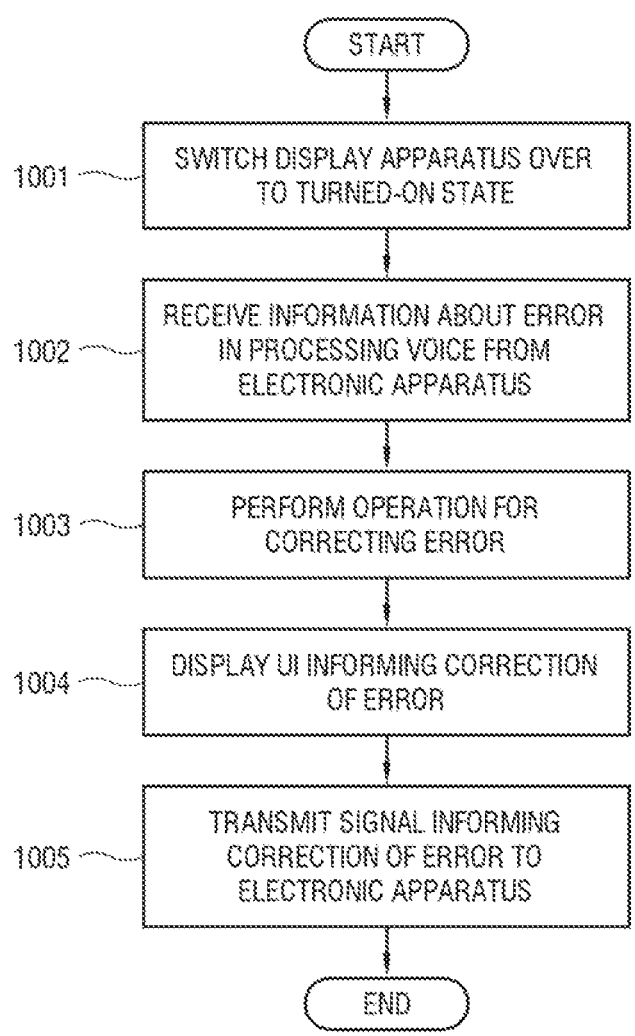
FIG. 18 is a flowchart showing a method of controlling the display apparatus according to the fifth embodiment of the disclosure.
Figure 19:
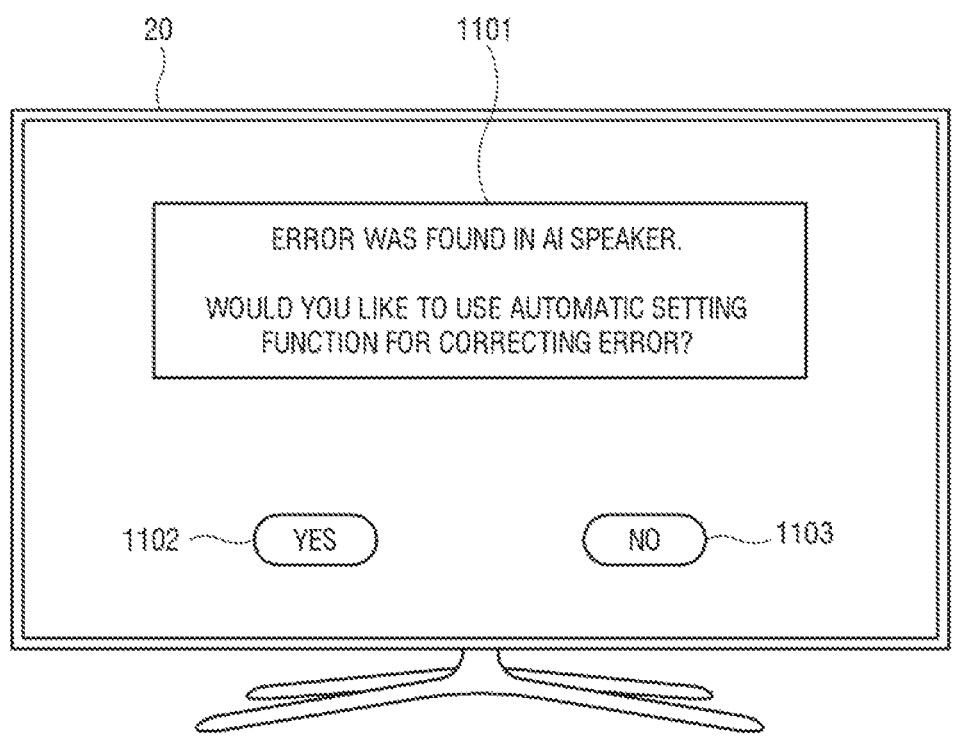
FIG. 19 illustrates an example of a user interface (UI) displayed on the display apparatus according to the fifth embodiment of the disclosure.
Figure 20:
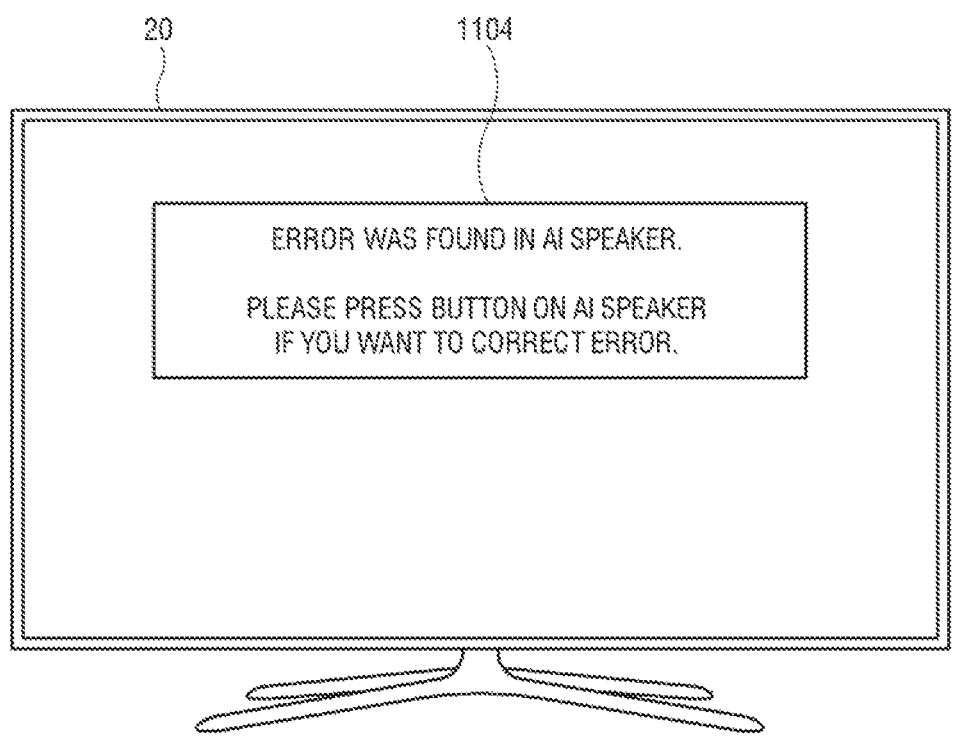
FIG. 20 illustrates another example a UI displayed on the display apparatus according to the fifth embodiment of the disclosure.
Figure 21:
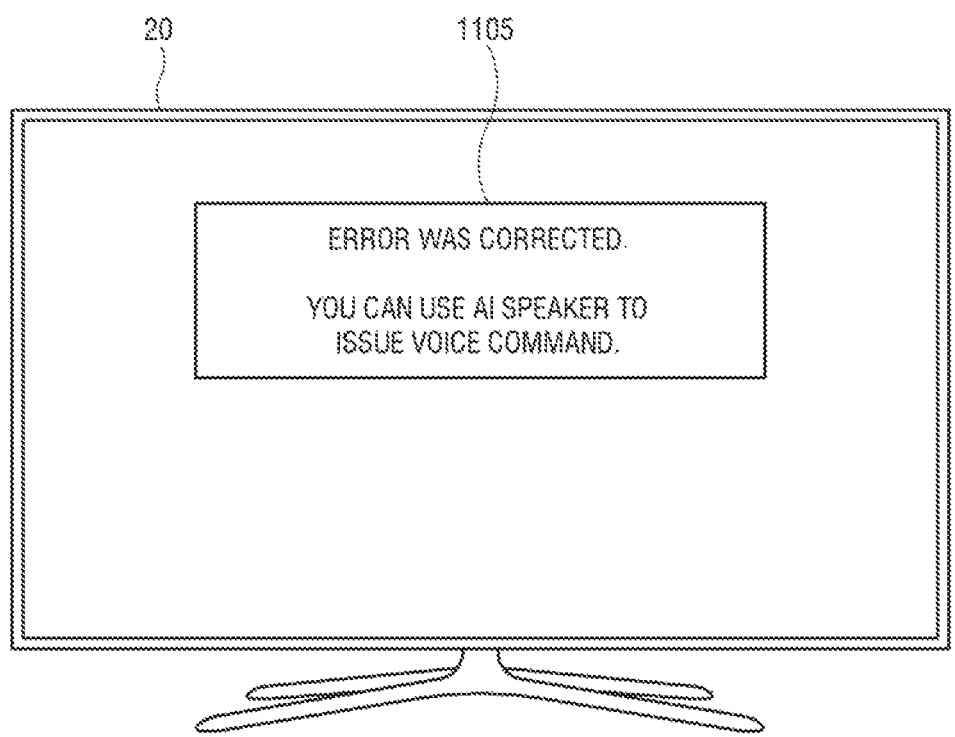
FIG. 21 illustrates another example a UI displayed on the display apparatus according to the fifth embodiment of the disclosure.

FIG. 16 conceptually illustrates operation between an electronic apparatus and a display apparatus according to a fifth embodiment of the disclosure, FIG. 17 is a flowchart showing a method of controlling the electronic apparatus according to the fifth embodiment of the disclosure, FIG. 18 is a flowchart showing a method of controlling the display apparatus according to the fifth embodiment of the disclosure, FIG. 19 illustrates a user interface (UI) displayed on the display apparatus according to the fifth embodiment of the disclosure, and FIGS. 20 and 21 illustrate UIs displayed on the display apparatus according to the fifth embodiment of the disclosure.

According to the fifth embodiment of the disclosure, the electronic apparatus 10 monitors an operation for processing a voice received through the microphone 120.

The electronic apparatus 10 may be embodied to transmit a turning-on request to the external apparatus, i.e. the display apparatus 20 as shown in FIG. 16 based on occurrence of an error. In response to the turning-on request from the electronic apparatus 10, the display apparatus 20 may be switched over from the turned-off state to the turned-on state.

Here, the electronic apparatus 10 may identify the power state of the display apparatus 20, i.e. whether the display apparatus 20 is in the turned-on state or the turned-off state. When it is identified that the display apparatus 20 is in the turned-off state, the electronic apparatus 10 may output a guide sound for turning on the display apparatus 20 through the speaker 110. The guide sound may further include a message for informing that an error occurs in the electronic apparatus 10.

Further, when it is identified that the error occurs in the electronic apparatus 10, information about the error may be transmitted to the display apparatus 20 as shown in FIG. 16. The display apparatus 20 may perform an operation for correcting an error, based on the received information about the error from the electronic apparatus 10.

Specifically, as shown in FIG. 17, the electronic apparatus 10 may perform monitoring an operation for applying a voice process to a user voice received in the microphone 120 (901). Here, the monitoring is to identify whether an error occurs in the voice process for operating the electronic apparatus 10 as the AI speaker, and may for example include identifying whether an error occurs in user login, network connection, music or the like service settings, device settings, etc., in which there are no limits to the kinds of errors.

According to an embodiment, the monitoring in the operation 901 may be performed in response to occurrence of a preset event such as an input of a user, a signal input through the communicator 140, etc. or may be periodically performed at predetermined time intervals.

Based on the monitoring in the operation 901, the processor 160 may identify that an error occurs in processing the voice (902). Here, the processor 160 may further identify the kinds of occurred error, for example, an error in user login, an error in service settings, etc.

In the operation 901, when it is identified that the error occurs in processing the voice, the processor 160 may identify whether the display apparatus 20 is in the turned-off state or the turned-on state through the communicator 140 (903). Here, the processor 160 may transmit a preset signal to the display apparatus 20 through the communicator 140, and identify the power state of the display apparatus 20, i.e. whether the display apparatus 20 is the turned-on state or the turned-off state according to whether a response signal to the preset signal is received from the display apparatus 20.

According to an embodiment, the processor 160 may output a guide sound for guiding a user to turn on the display apparatus 20 through the speaker 110 based on the identification in the operation 903 that the display apparatus 20 is in the turned-off state (904). According to the disclosure, there are no limits to the guide sound to be output, and the guide sound may for example include content for guiding a user to press a specific button of the electronic apparatus 10 so that a turning-on request can be transmitted to the display apparatus 20, or content for guiding a user to turn on the display apparatus 20.

According to another embodiment, the operation 904 of outputting the guide sound may be omitted in the electronic apparatus 10.

When it is identified in the operation 903 that the display apparatus 20 is in the turned-off state, the processor 160 may control the communicator 140 to transmit a request signal for turning on the display apparatus 20 to the display apparatus 20 (905).

According to an embodiment, when a user presses the specific button in response to the output of the guide sound for the press of the corresponding button in the operation 904, the processor 160 may for example transmit a request signal for turning on the display apparatus 20 through the communicator 140.

According to another embodiment, when it is identified that the display apparatus 20 is in the turned-off state, the processor 160 may directly transmit the request signal for turning on the display apparatus 20 through the communicator 140 without the output of the guide sound in the operation 904 or a user's control. The guide sound for guiding a user to turn on the display apparatus 20 may be output through the speaker 110 (904). According to the disclosure, there are no limits to the guide sound to be output, and the guide sound may for example include content for guiding a user to press a specific button of the electronic apparatus 10 so that a turning-on request can be transmitted to the display apparatus 20, or content for guiding a user to turn on the display apparatus 20.

The turning-on request signal in the operation 905 is received in the display apparatus 20, so that the display apparatus 20 can be switched over from the turned-off state to the turned-on state in response to the reception. The processor 260 of the display apparatus 20 may control the communicator 250 to transmit a signal for informing that the display apparatus 20 is turned on to the electronic apparatus 10, and therefore a feedback signal to the turning-on request is transmitted to the electronic apparatus 10.

When it is identified in the operation 903 that the display apparatus 20 is in the turned-on state, the processor 160 may control the communicator 140 to transmit information about an error identified in the operation 902 to the display apparatus (906).

According to an embodiment, the processor 160 may automatically transmit the information about the error to the display apparatus 20 through the communicator 140 in response to the display apparatus 20 being turned on.

According to another embodiment, when it is identified in the operation 903 that the display apparatus 20 is in the turned-on state, the processor 160 may output a guide sound for correcting the error through the speaker 110 (904). According to the disclosure, there are no limits to the guide sound to be output, and the guide sound may for example include content for guiding a user to press a specific button of the electronic apparatus 10 to correct the error.

When a user presses the corresponding button in response to the guide sound, the processor 160 may transmit information about the identified error to the display apparatus through the communicator 140.

The display apparatus 20 receives the information about the error from the electronic apparatus 10, and perform an operation for correcting the error in the electronic apparatus 10 based on the received information. Detailed operations for correcting the error, which are carried out in the display apparatus 20 will be described in detail with reference to FIG. 18.

The processor 160 may receive a signal for informing whether the error is corrected from the display apparatus 20 through the communicator 140 (907).

Here, the display apparatus 20 performs the operation for correcting the error based on the information transmitted in the operation 906, and feeds the signal for informing whether the error is corrected or not back to the electronic apparatus 10 as a result of the operation, in which the corresponding signal is received in the electronic apparatus 10 through the communicator 140.

Based on the signal received from the display apparatus 20 in the operation 907, the processor 160 of the electronic apparatus 10 may output a sound for informing the corrected error through the speaker 110 (908). Therefore, a result from correcting the error may be not only displayed on the display apparatus 20 but also output as a sound corresponding to an audio feedback based on the process result through the speaker 110.

Meanwhile, as shown in FIG. 18, the display apparatus 20 may be switched over from the turned-off state to the turned-on state (1001).

Here, the turned-off state refers to a kind of soft turned-off state in which the display apparatus 20 operates in the standby mode of receiving the standby power. As the first processor 261 of the turned-off state is woken up by the second processor 262, the display apparatus 20 is switched over to the turned-on state, in other words, the normal mode.

In the operation 1001, the display apparatus 20 is turned on based on, for example, the turning-on request transmitted from the electronic apparatus 10 to the display apparatus 20 in the operation 905 of FIG. 17.

The display apparatus 20 may receive information about the error in processing the voice from the electronic apparatus 10 through the communicator 240 (1002). The information about the error received in the operation 1002 may correspond to the information transmitted from the electronic apparatus 10 to the display apparatus 20 in the operation 906 of FIG. 17.

The processor 260 of the display apparatus 20 may perform an operation for correcting the error, based on the information received in the operation 1001 (1003). Here, the processor 260 may automatically perform the operation for correcting the error, based on identification that the display apparatus 20 is tuned on and the information about the error is received.

According to an embodiment, the processor 260 may correct an error in the electronic apparatus 10, based on the setting information about the display apparatus 20. For example, when a login error occurs due to a user account in the electronic apparatus 10, the processor 260 transmits information about the user account of the display apparatus 20 to the electronic apparatus 10, thereby allowing a user to log in to the electronic apparatus 10 with the transmitted information about the user account. Like this, the setting information (or setting values) of both the apparatuses 10 and 20 is paired, and it is thus easier to automatically correct various errors that may occur in the electronic apparatus 10.

According to another embodiment, for example, when an error occurs in logging in to the electronic apparatus 10 with a user account, the processor 260 may control the display 230 to display a screen including menu items for setting a user account. When a user sets the user account along a guide on the displayed screen, data of the setting result is transmitted to the electronic apparatus 10, thereby correcting the error in user login.

According to still another embodiment, the processor 260 may control the display 230 to display a UI about occurrence of an error, and performs an operation for correcting the error based on a user's selection on the displayed UI.

For example, as shown in FIG. 19, the processor 260 informs a user that an error occurs in the electronic apparatus 10, i.e. the AI speaker, and controls the display 230 to display at least one UI 1101, 1102 or 1103 for allowing the user to select whether to correct an error. When the user selects the item 1102 of "YES" among the displayed UIs, the processor 260 performs the corresponding operation for correcting the error.

Alternatively, the processor 260 may, as shown in FIG. 20, inform a user that an error occurs in the electronic apparatus 10, i.e. the AI speaker, and controls the display 230 to display a UI 1104 including a message for guiding a user's control for the correction.

According to the disclosure, the displayed UI about the occurrence of the error is not limited to that shown in the drawings. When a user makes selection for the correction of the error in response to the UI shown in FIG. 19 or 20, the error may be corrected automatically or based on user settings in the same manner as those of the foregoing embodiments.

When the operation for correcting the error is performed in the operation 1003, the processor 260 may control the display 230 to display a UI for informing a user that the error will be corrected (1004).

For example, as shown in FIG. 21, the processor 260 may control the display 230 to display a UI 1105 for informing a user that the error in the electronic apparatus 10, i.e. the AI speaker is corrected and the electronic apparatus 10 is back in working order.

When the operation for correcting the error is performed in the operation 1003, the processor 260 may control the communicator 240 to output a signal for informing the error correction to the electronic apparatus 10 (1005).

The processor 160 of the electronic apparatus 10 may receive the signal from the display apparatus 20, and output a sound based on the signal, i.e. a sound for informing the error correction through the speaker 110. Therefore, the error correction in the operation 1003 is not only displayed on the display apparatus 20 but also output as an audio feedback through the speaker 110.

According to the fifth embodiment of the disclosure, when an error occurs in processing a voice in the electronic apparatus 10, information about the error is transmitted to the display apparatus 20, and thus the error is corrected using the display apparatus 20. Therefore, a visual feedback on the correction of the error is provided through the screen of the display apparatus 20, and the automatic error correction is more convenient for a user.

Figure 22:
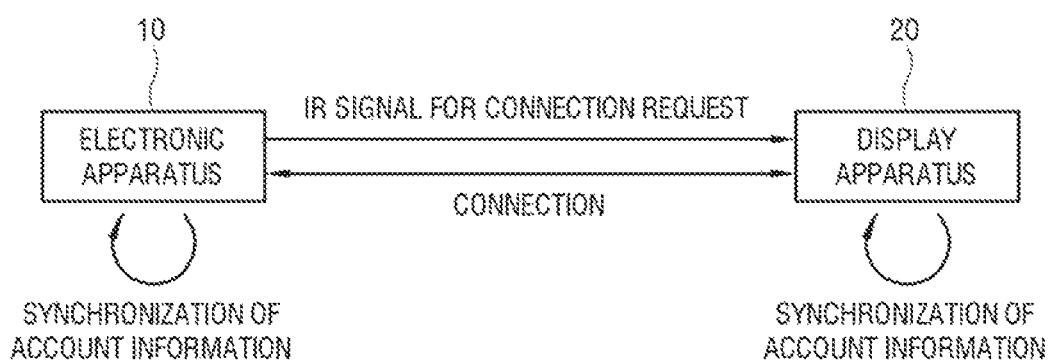
FIG. 22 conceptually illustrates operation between an electronic apparatus and a display apparatus according to a sixth embodiment of the disclosure.
Figure 23:
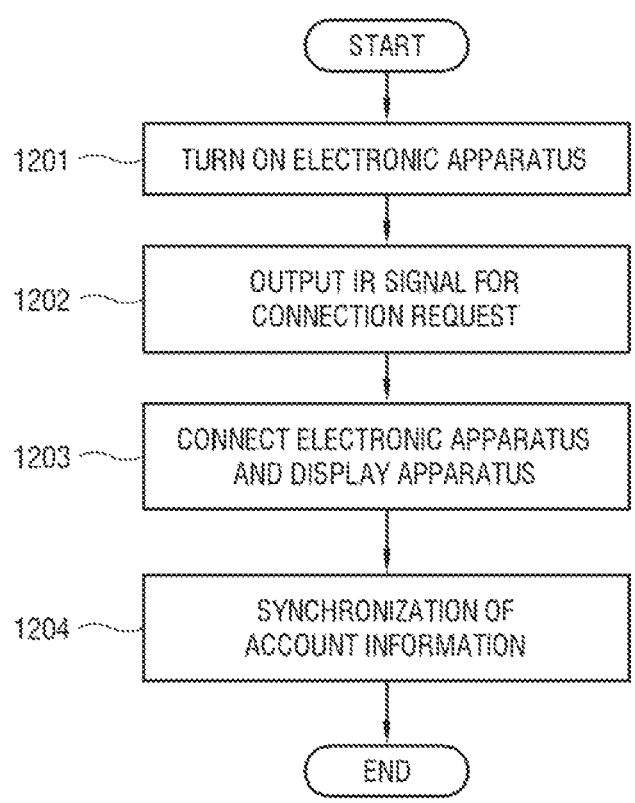
FIG. 23 is a flowchart showing a method of controlling the electronic apparatus according to the sixth embodiment of the disclosure.

FIG. 22 conceptually illustrates operation between an electronic apparatus and a display apparatus according to a sixth embodiment of the disclosure, and FIG. 23 is a flowchart showing a method of controlling the electronic apparatus according to the sixth embodiment of the disclosure.

The electronic apparatus 10 according to the sixth embodiment of the disclosure may further include an infrared (IR) emitter capable of outputting an IR signal having a predetermined frequency band as compared with the electronic apparatus according to the embodiment shown in FIG. 3, and the display apparatus 20 according to the sixth embodiment may further include an IR receiver capable of receiving the IR signal as compared with the embodiment shown in FIG. 4. In other words, the electronic apparatus 10 can emit an IR signal, and the display apparatus 20 can receive the IR signal.

According to the sixth embodiment, the electronic apparatus 10 may, as shown in FIG. 22, transmit an IR signal for a connection request from the electronic apparatus 10 to the display apparatus 20, so that both the apparatuses 10 and 20 can be connected based on the IR signal. Here, the electronic apparatus 10 and the display apparatus 20 may be connected to each other based on Wi-Fi, Bluetooth and the like wireless communication.

According to the sixth embodiment, the electronic apparatus 10 for example emits the IR signal when turned on by power supplied for the first time. In other words, when the electronic apparatus 10 is supplied with power as installed for the first time, the electronic apparatus 10 and the display apparatus 20 may be automatically paired based on the IR signal.

The electronic apparatus 10 and the display apparatus 20 connected by the wireless communication exchange, i.e. transmit and receive account information including user information with each other, so that the account information between both the apparatuses 10 and 20 can be synchronized with each other in real time as shown in FIG. 22.

Specifically, as shown in FIG. 23, the electronic apparatus 10 may be turned on, in other words, switched over from the turned-off state to the turned-on state (1201). Here, the electronic apparatus 10 may be turned on by power supplied for the first time.

When the electronic apparatus 10 is turned on in the operation 1201, the processor 160 outputs the IR signal for requesting the connection (1202).

The IR signal output in the operation 1202 may be received in the display apparatus 20. Here, the IR signal is a short-range wireless signal having directivity, and is therefore unlikely received in other apparatuses than the display apparatus 20, for example, a television or the like of a neighboring house.

The IR signal output in the operation 1202 may include identification information for connection with the display apparatus 20. The identification information may for example include a Bluetooth device address, a MAC address, etc. and the IR signal may include the identification information corresponding to the first communicator 140.

Based on the IR signal transmitted in the operation 1202, the electronic apparatus 10 and the display apparatus 20 may be connected (1203).

According to an embodiment, the processor 260 of the display apparatus 20 receiving the IR signal may establish communication by trying connecting with the electronic apparatus 10 based on the identification information included in the received IR signal. As the communication is successfully established, the electronic apparatus 10 and the display apparatus 20 are connected to communicate with each other.

The electronic apparatus 10 and the display apparatus 20 connected to each other in the operation 1203 may synchronize with each other with respect to synchronize with account information (1204). Here, the account information may include user information for login, for example, identification (ID) and a password, etc., and the electronic apparatus 10 and the display apparatus 20 may exchange, i.e. transmit and receive the account information including the user information with each other, so that both the apparatuses 10 and 20 can synchronize with each other with respect to the account information.

Therefore, the electronic apparatus 10 and the display apparatus 20 may be logged in with the same account, and service histories used with the corresponding account, for example, searching histories based on user voices, a list of frequently played music, etc. may be collectively managed by the external server 30.

Further, when there is a change in the account information, the electronic apparatus 10 and the display apparatus 20 may synchronize with each other reflecting the change in real time. Here, the changed account information may be transmitted to the server 30 in real time, so that the changes can be applied to not only the electronic apparatus 10 and the display apparatus 20 but also other devices such as a smartphone, etc. usable with the corresponding account.

According to the sixth embodiment of the disclosure, the electronic apparatus 10 outputs the IR signal when supplied with power to automatically connect with the display apparatus 20, and is therefore inconvenient for a user who is not used to using electronic devices because the user does not need to separately do communication settings. Further, the electronic apparatus 10 and the display apparatus 20 which are connected synchronize with each other with respect to the account information, so that a user can get services reflecting the up-to-date data under the same environments in all apparatuses.

As described above, according to an electronic apparatus, a display apparatus, and a method of controlling the same, the electronic apparatus capable of receiving and processing a user voice autonomously processes the user voice or allows the display apparatus to selectively process the user voice, and provides process results in accordance with on/off states of the display apparatus, thereby extending functions and services.

Further, according to an electronic apparatus, a display apparatus, and a method of controlling the same, the electronic apparatus autonomously processes a received user voice or allows the display apparatus to selectively process the user voice, and provides process results in accordance with service/content types provided by voice processes, thereby receiving more efficiently the service/content through a screen when visual feedback is needed.

Further, according to an electronic apparatus, a display apparatus, and a method of controlling the same, the electronic apparatus provides information about an error in processing a user voice to the display apparatus, so that the error can be corrected through the display apparatus.

Although a few exemplary embodiments have been shown and described, it will be appreciated that changes may be made in these exemplary embodiments without departing from the scope defined in the appended claims.

What is claimed is:

1. An electronic apparatus comprising:
   a speaker configured to output a sound;
   a microphone configured to receive a user voice input;
   a communicator configured to perform communication; and
   a processor configured to:
   based on the user voice input being received by the microphone, identify a state of an external apparatus, through the communicator enabled to communicate with the external apparatus in association with receipt of a response signal to a preset signal from the external apparatus,
   based on the state of the external apparatus being a turned-off state in response to non-reception of the response signal, perform a function corresponding to a first voice recognition with the received user voice input and output a sound corresponding to a result of the first voice recognition through the speaker, and
   based on the state of the external apparatus being a turned-on state in response to reception of the response signal, control the communicator to transmit the received user voice input to the external apparatus so that the external apparatus performs a function corresponding to a second voice recognition with the transmitted user voice input and displays an image corresponding to a result of the second voice recognition.

2. The electronic apparatus according to claim 1, wherein the processor controls the speaker to output a sound for guiding the user to turn on the external apparatus based on the state of the external apparatus being the turned-off state.

3. The electronic apparatus according to claim 1, wherein the processor controls the communicator to transmit a request signal, for turning on the external apparatus, to the external apparatus based on the state of the external apparatus being the turned-off state.

4. The electronic apparatus according to claim 1, wherein the processor is configured to:
   identify whether an error occurs in performing the function corresponding to the first voice recognition, and
   control the speaker to output a sound for guiding the user to turn on the external apparatus based on the error being identified as having occurred.

5. The electronic apparatus according to claim 1, wherein the processor is configured to:
   identify whether an error occurs in performing the function corresponding to the first voice recognition, and
   control the communicator to transmit information about the error to the external apparatus based on the error being identified as having occurred.

6. The electronic apparatus according to claim 1, wherein the processor is configured to:
identify a service type related to the user voice input, and identify whether to transmit the user voice input to request the external apparatus to perform the function corresponding to the second voice recognition based on the identified service type.

7. The electronic apparatus according to claim 6, wherein the processor is configured to control the communicator to transmit the user voice input to the external apparatus based on the service type being identified as being related to visual content.

8. A display apparatus comprising:
a display configured to display an image;
a communicator configured to perform communication with an external apparatus; and
a processor configured to:
based on identification of a change from a turned-off state to a turned-on state, identify whether the external apparatus is connected to the display apparatus, the identification of the change from the turned-off state to the turned-on state being performed in association with a request signal for turning on the display apparatus received from the external apparatus,
receive a user voice input from the external apparatus through the communicator based on the external apparatus being identified as being connected to the display apparatus, the user voice input being received based on a response signal transmitted to the external apparatus in response to the request signal, and
perform a function corresponding to a second voice recognition with the received user voice input and control the display to display an image corresponding to a result of the second voice recognition, the function corresponding to the second voice recognition being different from a function corresponding to a first voice recognition performed by the external apparatus.

9. The display apparatus according to claim 8, further comprising a user input receiver configured to receive an input of the user,
the processor being configured to identify the change from the turned-off state to the turned-on state based on the received input of the user.

10. The display apparatus according to claim 8, wherein the processor is configured to control the display to display a user interface (UI) about an error in performing the function corresponding to the first voice recognition based on identification that information about the error is received from the external apparatus through the communicator.

11. The display apparatus according to claim 10, wherein the processor is configured to identify whether information about the error is received, based on the identification of the change from the turned-off state to the turned-on state.

12. A method of controlling an electronic apparatus, comprising:
based on a user voice input being received by a microphone, identifying a state of an external apparatus in association with receipt of a response signal to a preset signal from the external apparatus;
based on the state of the external apparatus being a turned-off state in response to non-reception of the response signal, perform a function corresponding to a first voice recognition with the received user voice input and outputting a sound corresponding to a result of the first voice recognition through a speaker; and
based on the state of the external apparatus being a turned-on state in response to reception of the response signal, transmitting the received user voice input to the external apparatus so that the external apparatus performs a function corresponding to a second voice recognition with the transmitted user voice input and displays an image corresponding to a result of the second voice recognition.

13. The method according to claim 12, further comprising:
outputting a sound for guiding the user to turn on the external apparatus through the speaker based on the state of the external apparatus being the turned-off state.

14. The method according to claim 12, further comprising:
transmitting a request signal for turning on the external apparatus to the external apparatus based on that the state of the external apparatus being the turned-off state.

15. The method according to claim 12, further comprising:
identifying whether an error occurs in performing the function corresponding to the first voice recognition; and
outputting a sound for guiding the user to turn on the external apparatus through the speaker based on the error being identified as having occurred.

16. The method according to claim 12, further comprising:
identifying whether an error occurs in performing the function corresponding to the first voice recognition; and
transmitting information about the error to the external apparatus based on the error being identified as having occurred.

17. The method according to claim 12, further comprising:
identifying a service type related to the user voice input; and
identifying whether to transmit the user voice input to request the external apparatus to perform the function corresponding to the second voice recognition based on the identified service type.

18. A method of controlling a display apparatus, comprising:
based on identification of a change from a turned-off state to a turned-on state, identifying whether an external apparatus is connected to the display apparatus for communication, the identification of the change from the turned-off state to the turned-on state being performed in association with a request signal for turning on the display apparatus received from the external apparatus,
receiving a user voice input from the external apparatus based on the external apparatus being identified as being connected, the user voice input being received based on a response signal transmitted to the external apparatus in response to the request signal, and
performing a function corresponding to a second voice recognition with the received user voice input and displaying an image corresponding to a result of the second voice recognition, the function corresponding to the second voice recognition being different from a function corresponding to a first voice recognition performed by the external apparatus.

19. The method according to claim 18, further comprising:

displaying a user interface (UI) about an error in performing the function corresponding to the first voice recognition based on identification that information about the error is received from the external apparatus.

* * * * *